United States Patent [19]
Iino et al.

[11] Patent Number: 5,699,553
[45] Date of Patent: Dec. 16, 1997

[54] MEMORY ACCESSING DEVICE FOR A PIPELINE INFORMATION PROCESSING SYSTEM

[75] Inventors: Hideyuki Iino; Hiromasa Takahashi; Hiroyuki Fujiyama; Koichi Kuroiwa; Kenji Shirasawa, all of Kawasaki, Japan

[73] Assignee: Fujitsu Limited, Kanagawa, Japan

[21] Appl. No.: 988,596

[22] Filed: Dec. 10, 1992

[30] Foreign Application Priority Data

Dec. 10, 1991 [JP] Japan ............... HEI03-326129
Jan. 30, 1992 [JP] Japan ............... HEI04-015565

[51] Int. Cl.⁶ ............... G06F 13/18; G06F 12/10
[52] U.S. Cl. ............... 395/478; 395/496; 395/737; 395/421.08; 395/421.03; 395/416; 395/183.19; 395/800
[58] Field of Search ............... 395/425, 575, 395/800, 325, 496, 421.08, 421.03, 293, 299, 416, 285, 287, 183.19, 478, 737

[56] References Cited

U.S. PATENT DOCUMENTS

| | | | |
|---|---|---|---|
| 4,524,415 | 6/1985 | Mills, Jr. et al. | 395/182.19 |
| 4,845,614 | 7/1989 | Hanawa et al. | 395/182.14 |
| 5,003,458 | 3/1991 | Yamaguchi et al. | 395/733 |
| 5,063,497 | 11/1991 | Cutler et al. | 395/800 |
| 5,276,836 | 1/1994 | Fukumaru et al. | 395/465 |

FOREIGN PATENT DOCUMENTS 0 297 893  1/1989  European Pat. Off.
0 331 372  9/1989  European Pat. Off.

OTHER PUBLICATIONS

Goodman, John M, "Memory Management for All of Us", SAMS (Prentice Hall Computer Publishing), 1992;p. 126.
"Hardware Architecture Considerations in the WE32100 Chip Set", Fuccio et al, 8207 IEEE Micro, vol. 6, No. 2, Apr. 1986, pp. 29–46.
"Internal Chip Bus Request Prioritization", IBM Technical Disclosure Bulletin, vol. 32, No. 4A, Sep. 1989, pp. 96–98.
Patent Abstracts of Japan, vol. 6, No. 27 (P–102), Feb. 17, 1982 & JP–A–56 145 446.
"Implementing Precise Interrupts in Pipelined Processors", Smith et al, IEEE Transactions on Computers, vol. 37, May 1988, No. 5, pp. 562–573.

*Primary Examiner*—Eddie P. Chan
*Assistant Examiner*—Reginald Bragdon
*Attorney, Agent, or Firm*—Nikaido Marmelstein Murray & Oram LLP

[57] ABSTRACT

A memory accessing device is connected to a central processing unit and a memory unit via a common bus. The memory accessing device accesses the memory unit independently of the central processing unit. The device includes an address generating unit for generating an address, an address control unit for outputting the generated address to the bus, and a control unit for controlling the address control unit to suspend or terminate memory access controlled in an address pipeline mode when the memory accessing device internally or externally issues a request for the suspension or the termination of the memory access controlled in the address pipeline mode. The control unit terminates or suspends the memory access when it receives a request internally or externally of the memory accessing device for the suspension or the termination of the memory access.

14 Claims, 26 Drawing Sheets

|  | SET CONDITION | RESET CONDITION | |
|---|---|---|---|
| IREQ# | L | H | L |
| IERR# | H | H | L |
| HACK# | H | L | L |

Fig. 10

MEMORY ACCESSING DEVICE FOR A PIPELINE INFORMATION PROCESSING SYSTEM

BACKGROUND OF THE INVENTION

1. Field of the Invention

The present invention relates to an information processing system connected to a bus for connection to a central processing unit, a memory unit, and an I/O unit, and accesses the memory unit and the I/O unit independently of the central processing unit. It relates more specifically to a bus accessing device for a plurality of information processing systems, connected to a bus, for transmitting and processing data through the bus after obtaining a bus use right, and to a memory accessing device, provided for a pipeline information processing system, for interrupting or terminating an access to a memory unit when an interrupt or a terminate request is issued during the pipeline process in which the pipeline information processing unit performs a pipeline process after obtaining a bus use right.

2. Description of the Related Art

Among various high performance data processing devices, a number of data processing systems having processors specifically used for performing arithmetic operations or drawing figures have been developed.

With these data processing systems, these specific processors other than the main processor also function as bus masters for performing control operations such as issuing a bus address, etc. Therefore, if a plurality of bus masters try to obtain the right to use a system bus, then it may cause a conflict among them.

Accordingly, to prevent a conflict for the right to use a system bus, the right to be a bus master should be optimally assigned. That is, the bus use right should be assigned through arbitration (hereinafter referred to as bus arbitration).

An example of the conventional bus control methods as described above is shown in FIG. 1 in which the method is applied to a data processing system.

The data processing system comprises a main processor 1 for controlling the data processing system, LSI (large scale integrated circuit) 2 as a co-processor for performing arithmetic operations of data being processed, LSI 3 as a CRT (cathode ray tube) controller for specifically drawing pictures in displaying the process results on a display, and a memory 4 connected to a system bus SB. The main processor 1, LSI 2, and LSI 3 can be bus masters for the system bus SB.

With the above mentioned configuration, the bus arbitration in a data processing system comprising a plurality of LSIs capable of functioning as bus masters (two LSIs in this case) is usually executed by a handshaking process using a bus-use-right request signal (hereinafter referred to as an HREQ# signal) and a bus-use-right permission signal (hereinafter referred to as an HACK# signal). In this case, the arbitration between the main processor 1 and LSI 2 capable of functioning as a bus master is described below by referring to FIG. 6.

First, assume that the main processor 1 normally has the bus use right, uses a system bus SB, and transmits data to and from the memory 4, etc. In this state, the HACK# signal output by the main processor 1 indicates the inactive state (the H level). Accordingly, it is determined that LSI 2 receiving the HACK# signal has no bus use right, and the system bus SB is not accessed (refer to part (a) in FIG. 2). The HREQ# and the HACK# signals are negative logic signals (hereinafter, a signal ending with "#" indicates a negative logic signal). The word "active" indicates that a present signal is true, while the word "inactive" indicates that a present signal is false regardless of the positive/negative logic.

Next, when the system bus SB should be used by LSI 2, the HREQ# signal indicates the active state (the L level) by LSI 2 and a bus-use-right request is issued to the main processor 1 (refer to part (b) in FIG. 2).

If the HREQ# signal indicates the active state, then LSI 2 is retained in a wait state until the HACK# signal indicates the active state (refer to part (c) in FIG. 2). At the time when the main processor 1 is ready to pass the bus use right to LSI 2, the main processor 1 makes the HACK# signal indicate the active state, thus permitting LSI 2 to use the bus (refer to part (d) in FIG. 2). LSI 2 acquires the bus use right after the HACK# signal indicates the active state (refer to part (d) in FIG. 2).

The bus arbitration between the main processor 1 and LSI 2 is described by referring to the example above. Furthermore, if LSI 3 is included as a prospect of a bus master, then the bus arbitration is performed between the main processor 1 and LSI 2 or 3 using the HREQ# and the HACK# signals.

With such a conventional bus control method, the bus arbitration is performed between the main processor 1 and a plurality of LSIs (LSIs 2 and 3 in this case) capable of functioning as bus masters using a bus-use-right request signal HREQ# and a bus-use-right response signal HACK#. To prevent erroneous determination in assigning a bus use right, LSI 2 (or LSI 3) for making the bus use right signal HREQ#indicate the active state has to confirm that the signal is not output by the other LSI 3 (or LSI 2).

However, after LSI 2 has made the bus-use-right request signal HREQ# indicate the active state in the case shown in FIG. 3, and the bus-use-right request signal HREQ# can be made to indicate the active state by the other LSI 3 if, the bus-use-right response signal HACK# indicates the active state, the bus-use-right request signal HREQ# indicates the inactive state when LSI 2 has become inoperative due to an error internally causes in the LSI 2 after it obtained the bus use right (refer to part (f) in FIG. 3).

If, in this state, LSI 3 makes the bus-use-right request signal HREQ# indicate the active state (refer to part (g) in FIG. 3), then it is very difficult for the main processor 1 to determine whose bus-use-right request signal HREQ# is to be accepted when the bus-use-right response signal HACK# indicates the active state (refer to part (h) in FIG. 7). This often causes a malfunction of the whole system.

However, if the system is provided with an external circuit specifically for executing the bus arbitration as a countermeasure to the malfunction of the system, then the entire configuration becomes undesirably complicated.

The operational frequency of the main processor 1 described above has become considerably high, requiring the speed-up of the memory access for LSIs 2 and 3. If an external memory unit is provided with a static RAM (hereinafter referred to as a SRAM for short), a response can be output at a speed high enough to match the operational frequency of the high speed memory accessing device. However, since it is very expensive, it is not appropriate as a main storage unit in consideration of the total cost for the system. Therefore, it is used only as a cache memory and a small capacity local memory.

Therefore, a dynamic RAM (hereinafter referred to as a DRAM for short) is used as a main storage unit. It is divided into a plurality of independently operative modules called "banks" and used with the interleave method for effectively speeding up the main storage unit through parallel operation of all banks.

FIG. 4 shows the configuration of the memory 4 divided into four banks BANK 0–3 based on the interleave method. The contents of four consecutive addresses in a memory cycle can be simultaneously accessed by operating all banks in parallel by means of a memory accessing device 5 for LSI 2 and LSI 3, using the two low order bits of an address stored in the address latch of each bank to designate the bank, using high order bit to designate the address within each bank. This realizes a memory capable of operating at a 4-times higher speed.

There is an address pipeline method of speeding up the memory accessing process to realize a higher performance computer system. It outputs an address ahead by a predetermined number of cycles without waiting for an external data response signal.

FIG. 5 is a timing chart of an address pipeline through which four addresses are output first as a prefetch address in the memory 4 shown in FIG. 4. In the memory 4, four clocks are required as the time to access one piece of data. According to the address output by the memory accessing device 5, the data at the address can be obtained four clocks after the determination of each bank address.

In this case, addresses are consecutively output by the memory accessing device 5, and after four clocks the data at the addresses are consecutively output. Thus, the address pipeline is used for shortening the access time by handling by the interleave method relatively slow access DRAMs divided into banks as if they were high speed memories. It is popularly used as an effective method of speeding up the operation of a computer system.

The timing at which the memory accessing device 5 for LSIs 2 and 3 accesses the memory 4 through an address pipeline is further described below.

When the memory accessing device 5 has obtained a bus use right according to the above described bus-use-right request signal HREQ# and the bus-use-right response signal HACK#, the necessary memory access is usually performed consecutively. In the meantime, the memory accessing device 5 retains the bus use right continuously, and accesses memories based on the address pipeline method.

FIG. 6 is the timing chart for explaining the operation above. It shows an example of an address pipeline through which four addresses are output first, and the bus access indicates an 8-time phase data read cycle.

In FIG. 6, CLK indicates a clock signal for driving a system; Address(O) indicates an address output of the memory accessing device 5; R/W# (O) indicates a read/write signal; Data(I) indicates data input by the memory accessing device 5; DC# (I) indicates an access response signal output by a memory informing that data access is completed. In the representation of a signal, (I) indicates an input signal to the memory accessing device 5, and (O) indicates an output signal from the memory accessing device 5.

First, the memory accessing device 5 outputs the bus-use-right request signal HREQ# (O) to the main processor 1 to request bus use right. If, in response to this, the response signal HACK# (I) indicates the active state, then the access to the memory 4 is started. That is, address values A1, A2, . . . are continuously output as address outputs Address(O) in synchronization with the clock CLK. After four clocks, data D1, D2, . . . are output on the data input Data(I).

FIG. 6 shows the three processes as the operation of an address pipeline, that is, outputting an address first as a prefetched address, outputting an address and inputting/outputting data, and inputting/outputting data.

An address pipeline normally accesses memories, etc. continuously, and realizes a high performance system by the consecutive access.

However, as described below, an address pipeline process may have to be compulsorily terminated or suspended, but the conventional memory accessing device 5 is not provided with such functions, thus causing the reduction of the performance and the reliability of the computer system.

(1) If the main processor 1 should use the bus SB immediately:

The main processor 1 is provided with a cache memory and a store buffer to be accessed, for example, for realizing a high performance system. Accordingly, the main processor 1 is not kept waiting because these cache memories and store buffers are accessed even if another memory accessing device 5 has the bus use right of the bus SB and the main processor 1 cannot obtain the bus use right.

However, if it is a write-through control system for writing data to both a cache memory and the memory 4, a block to be written to is in the cache memory, and the main processor 1 overwrites the contents of the cache memory, then the overwritten contents of the cache memory should be immediately written to the memory 4 so as to maintain the consistency between the contents of the cache memory and those of the memory 4.

Even if data are written only to the cache memory and the data are transferred to the memory 4 to update its contents when the updated block is to replace any data, that is, a copyback control method, the updated block must be written to the memory 4 when it should replace any data. Furthermore, if the above described store buffer of the main processor 1 becomes full, then the data should be stored in the memory 4.

When the memory 4 cannot be accessed as described above, the main processor 1 should wait for the next process. That is, the main processor 1 outputs a bus-use-right request signal GBR# (global bus request) for accessing a memory. However, the memory accessing device 5 performing an address pipeline process is not provided with a unit for receiving the signal. Therefore, if it is not provided, either, with a unit for compulsorily releasing the bus SB, then the main processor 1, having output the bus-use-right request signal GBR#, continues waiting for the next process. However, keeping the main processor 1 waiting for a process reduces the performance of the system.

(2) When the bus-use-right response signal HACK# indicates the inactive state due to the malfunction of the bus SB:

The state in which the memory accessing device 5 has the bus use right means that the bus-use-right request signal HREQ# (O) indicates the active state and the response signal HACK# (I) also indicates the active state. When the both signals indicate the active state, the memory accessing device 5 is assumed to have the bus use right, and accesses the bus. However, if the bus-use-right response signal HACK#(O) indicates the inactive state due to the malfunction of the bus SB caused by a hardware fault, etc. during an operation even though the memory accessing device 5 has a bus use right, then the bus-use-right request signal HREQ# (O) indicates the active state and the response signal HACK#(I) does not indicate the active state. Therefore, it is determined that the memory accessing device 5 does not have the bus use right. If the memory accessing device 5 is not provided with a unit for immediately suspending an address pipeline process, then it continues accessing the bus though it does not have a bus use right, possibly causing a conflict for a bus with a signal output by another unit on a bus SB, and resulting in the reduction of the reliability of the system.

Generally, such a system is not prepared. However, it may be used for releasing a bus, etc. in a debugging process, and can generate the problem described above.

(3) When the memory accessing device 5 has an internal exception:

For example, if the memory accessing device 5 internally performs an arithmetic operation containing a floating point, etc., and the result is stored in the memory 4, then an internal exception may exist in the memory accessing device 5 when an exception such as an overflow, an invalid operation, etc. occurs during the arithmetic operation.

In this case, the address pipeline process should be suspended immediately and the existence of the exception must be notified to the main processor 1. However, if the memory accessing device 5 is not provided with a unit for this purpose, then the bus is continuously accessed with an exception, the existence of the exception is notified to the main processor 1 with delay, and an error recovery process is delayed accordingly.

For example, if the memory accessing device 5 is a vector processor, etc. and an error occurs during the arithmetic operation through a DO-LOOP in the vector processor, then the arithmetic operation in the DO-LOOP for repeating the same arithmetic operation several times becomes invalid and should be suspended. However, the notification to the main processor 1 is delayed, and the corresponding action is also delayed.

Thus, continuing the process including an exception may reduce the reliability of the system.

(4) When the memory accessing device 5 converts an address:

If an error occurs in a TLB (translation look aside buffer) when the memory accessing device 5 has a built-in conversion table TLB, that is, when it is provided with a DAT (dynamic address translation) function, then the address pipeline process should be immediately suspended and any unit for executing an entry cycle to update a conversion table TLB must be mounted. However, no unit for notifying the occurrence of errors are mounted and the corresponding actions cannot be taken immediately.

(5) When an exception exists in a bus:

For example, if an external circuit detects an exception such as a bus time-out, a parity error, a request for access to a prohibited unit when the memory accessing device 5 is accessing a bus, then the address pipeline should be terminated immediately. Continuing the process with the exception may reduce the reliability of the system.

In the conventional memory accessing described above, an address pipeline process should be compulsorily suspended but cannot be, and undesirably incurs the reduction of the performance and the reliability of a computer system when:

(1) the main processor has to use a bus immediately,
(2) a bus-use-right response signal indicates the inactive state due to the malfunction of a bus,
(3) an exception exists in a memory accessing device,
(4) a memory accessing device converts an address, and
(5) an exception exists in a bus.

SUMMARY OF THE INVENTION

The present invention relates to an information processing system, and aims at preventing a malfunction caused by an error during the bus arbitration, and effectively simplifying the circuit for the arbitration process.

Another object of the present invention is to compulsorily suspend or terminate the address pipeline mode at a request internally and externally of the device, and provide a memory accessing device for improving the performance and the reliability of a computer system.

A feature of the present invention resides in a memory accessing device comprising address generating means for generating a subsequent address for accessing a memory in address pipeline mode before a current data cycle for receiving data is completed, control means for terminating the memory access after data, corresponding to an address which has been output when a termination of the memory access is requested, are received.

Another feature of the present invention resides in an information processing system comprising a main processor for performing main processes in a system, a plurality of processors for functioning as bus masters, wherein when one of a plurality of the processors issues a request for the right to use the system bus, a bus-use-right request signal (HREQ#) is output to the main processor, the right to use the system bus is assigned to the processor which has output the bus-use-right request signal (HREQ#) after a bus-use-right permission signal (HACK#) is output in response to the bus-use-right request signal (HREQ#) by the main processor, and the processor is qualified to function as a bus master, when the processing means becomes inoperative to the system bus after outputting the bus-use-right request signal (HREQ#), the bus-use-right permission signal (HACK#) output by the main processor is detected, and the bus-use-right request is released after the confirmation of the assignment of the right to use the system bus according to the bus-use-right permission signal (HACK#).

BRIEF DESCRIPTION OF THE DRAWINGS

One skilled in the art can easily understand additional features and objects of this invention from the description of the preferred embodiments and some of the attached drawings. In the drawings:

FIG. 10 is a table of set/reset conditions of the present invention;

DESCRIPTION OF THE PREFERRED OF THE EMBODIMENTS

Figure 7:
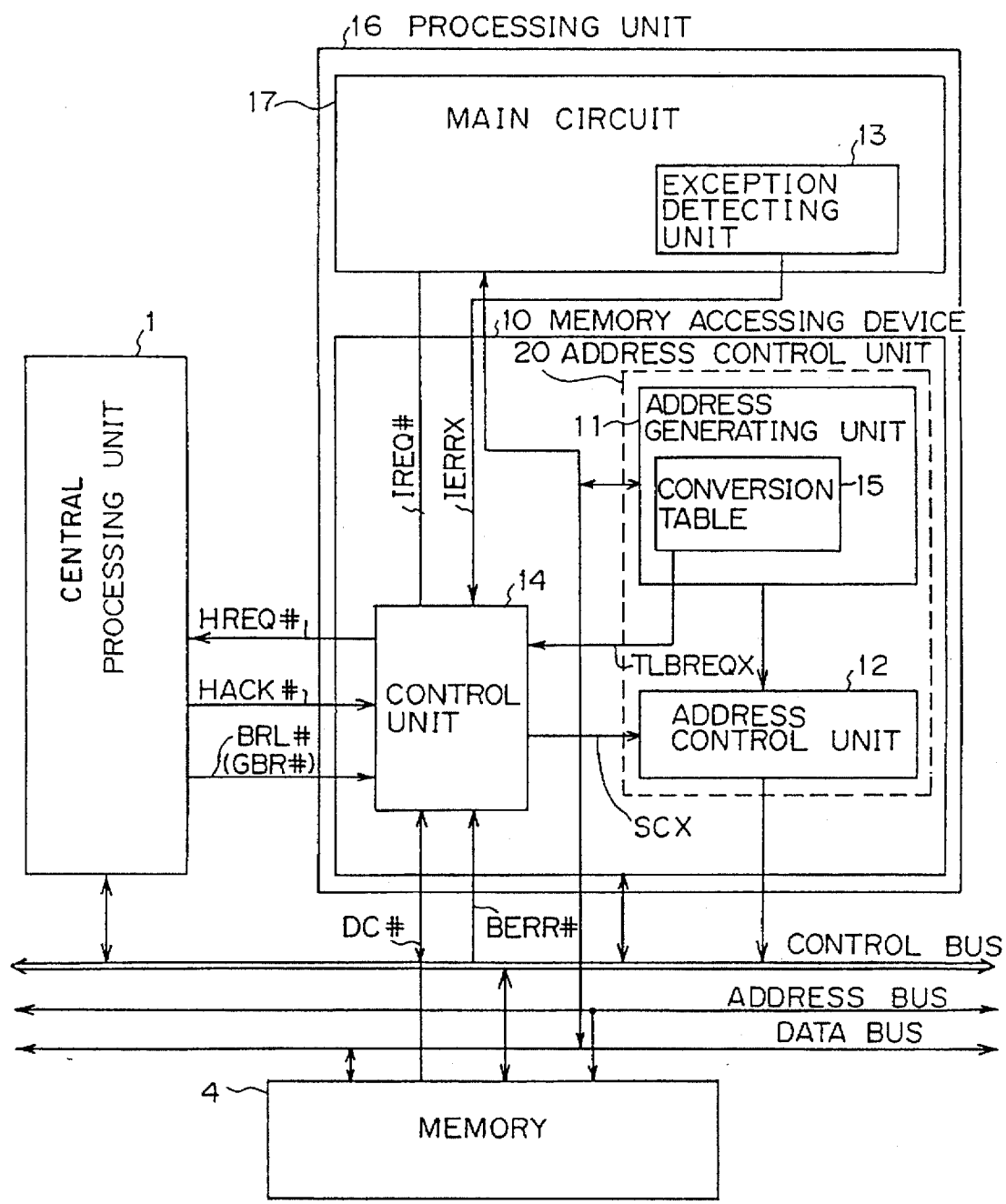
FIG. 7 is the block diagram for explaining the principle of the present invention.

FIG. 7 is the block diagram for explaining the principle of the present invention. The present invention comprises the main processor (central processing unit) 1 for performing important processes in the system and a plurality of processing units 16 capable of functioning as bus masters by occupying a system bus SB or common bus, for example, LSIs. When one of the plural processing units 16 issues a request for the right to use the system bus SB through a main circuit 17, a control unit 14 outputs to the main processor 1 a bus-use-right request signal HREQ#. After outputting a bus-use-right request signal HREQ# in response to a bus-use-right response signal HACK# output by the main processor 1 according to the bus-use-right request signal HREQ#, the processing unit 16 is assigned the right to use the system bus and functions as a bus master. When the plural processing units 16 become inoperative to the system bus after the output of the bus-use-right request signal HREQ#, they detect a bus-use-right response signal output by the main processor 1, confirm the assignment of the right to use the system bus according to the bus-use-right response signal, and release the request for the bus use right. The processing unit 16 comprises, for example, a memory accessing device for accessing the memory 4 through an address pipeline for outputting an address first. The control unit 14 is provided in the memory accessing device 10.

When a processing unit becomes inoperative to the system bus SB after the output of the bus-use-right request signal HREQ#, the request for a bus use right is released after the confirmation of the assignment of the right to use the system bus, that is, after the reception of the bus-use-right response signal HACK# in response to the output bus-use-right request signal HREQ#. Therefore, a request from any of other processing units 16 for a bus use right is rejected from the moment when a processing unit becomes inoperative to the system bus to the moment when the request for a bus use right is released. Since a request for a bus use right is released according to a bus-use-right response signal from the main processor 1, the bus arbitration can be easily executed only by preparing a logical circuit for setting a predetermined logic according to the various signals described above. That is, a malfunction caused by an error during the bus arbitration can be effectively prevented, and a specific external circuit for executing the arbitration can be successfully simplified.

The present invention comprises a memory accessing device 10, connected to the memory 4 through the bus SB, for accessing independently of the main processor 1 the memory 4 through the address pipeline for outputting an address first.

It further comprises an address generating unit 11 for generating an address at which a memory is accessed, an address control unit 12 for outputting a generated address to the bus, and the control unit 14 for suspending or terminating the memory access through the address pipeline under control by the address control unit 12 when a request signal BRL# for suspending or terminating the memory access by controlling the address pipeline is applied internally or externally by the memory accessing device 10. When a request signal BRL# for suspending or terminating the memory access by controlling the address pipeline is applied internally or externally by the memory accessing device 10, the address pipeline is compulsorily terminated or suspended.

With the above described configuration, when the main processor 1 must immediately use the bus SB, the main processor 1 outputs a bus-use-right request signal BRL# for accessing a memory, the memory 4 outputs an access response signal DC# on completion of the memory access to one address, and the control unit 14 terminates the data input/output process according to the number of prefetched addresses if it receives a bus-use-right request signal BRL# from the main processor 1 when the access response signal DC# indicates the active state during the memory access controlled by the address pipeline, suspends the memory access controlled by the address pipeline, and makes the bus-use-right request signal HREQ# indicate the inactive state to the main processor 1. Therefore, when the main processor 1 has to immediately use the bus SB, it can take over the next process by compulsorily suspending the address pipeline without waiting after having output a bus-use-right request signal BRL#. Thus, the performance of the system can be greatly improved. When the main processor 1 receives a bus-use-right request signal HREQ# from the memory accessing device 10, the main processor 1 outputs a bus-use-right response signal HACK#, the memory 4 outputs an access response signal DC# on completion of the memory access to one address, the control unit 14 terminates the input/output of data depending on the number of prefetched addresses and then suspends the memory access controlled by the address pipeline if the bus-use-right response signal HACK# from the main processor 1 indicates the inactive state due to the malfunction of the bus SB during the memory access controlled by the address pipeline. An address bus pipeline process can be compulsorily suspended even if a bus-use-right response signal HACK# compulsorily indicates the inactive state by any of other units connected to the bus SB, for example, due to the malfunction of the bus SB. Thus, since a bus is not accessed continuously, there is no conflict for a bus with signals output by other units. As a result, the reliability of the system can be greatly improved.

An exception detecting unit 13 detects an internal exception in the main circuit 17 in the processing unit 16 and outputs an internal exception signal IERRX. On receiving the internal exception signal IERRX during the memory access controlled by the address pipeline, the control unit 14 terminates the data input/output process depending on the number of first-output or prefetched addresses, terminates the memory access controlled by the address pipeline, and makes the bus-use-right request signal HREQ#indicate the inactive state to the central processing unit 1. When an exception exists in the main circuit 17 in the processing unit 10, the address pipeline can be compulsorily terminated. Therefore, the bus is not accessed continuously with the exception, and an error recovery process is not delayed.

The address generating unit 11 comprises a conversion table 15 for converting a logical address to a physical address. The conversion table 15 outputs an entry request signal TLBREQ# when there is no corresponding physical address in the table. On receiving the entry request signal TLBREQ# from the conversion table 15 during the memory access controlled by the address pipeline, the control unit 14 terminates the data input/output process depending on the number of prefetched addresses, and suspends the memory access controlled by the address pipeline. Thus, if there is no corresponding physical address in the conversion table 15 when the memory accessing device 10 converts an address, then the address pipeline can be compulsorily suspended.

Furthermore, the memory 4 outputs an access response signal DC# when the memory access to one address is completed. The bus SB makes a bus error signal indicates the active state when an exception exists in a bus. If the control unit 14 detects, when the access response signal DC# indicates the active state, that the bus error signal BERR# from the bus SB indicates the active state during the memory access controlled by the address pipeline, then it immediately terminates the memory access controlled by the address pipeline. Thus, the address pipeline can be compulsorily terminated when an exception exists in a bus, and the reliability of the system can be greatly improved.

The embodiment of the present invention is described further in detail by referring to the attached drawings.

Figure 8:
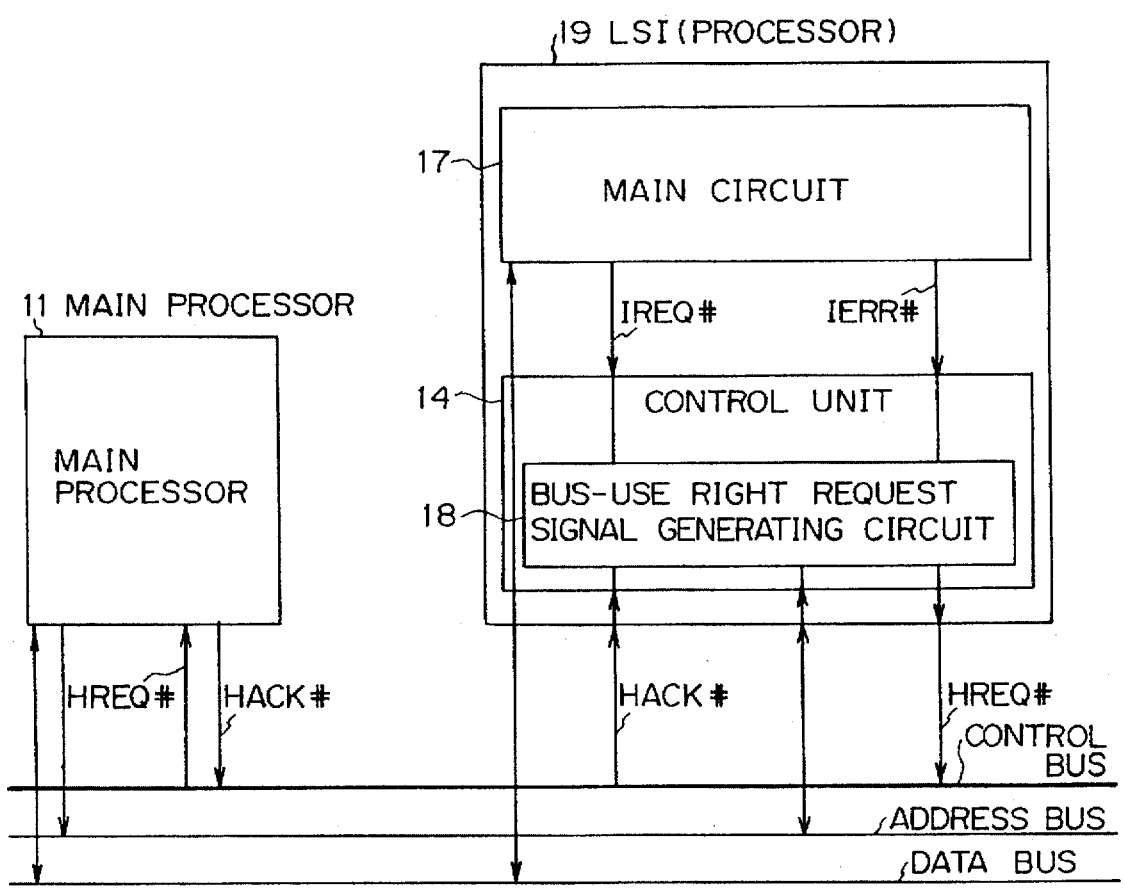
FIG. 8 is a view showing the configuration of the important part of the information processing system according to the present invention.

FIG. 8 is a view showing the configuration of the important part of the information processing system according to the present invention.

The information processing system of the present embodiment according to the present invention as shown in FIG. 8 mainly comprises the main processor 11, that is, a main processor, and an LSI 19 which is one of the plural processing units 16 capable of functioning as bus masters.

The LSI 19 comprises, for example, the main circuit 17 provided for performing predetermined processes such as arithmetic operations, drawing figures, etc. and a bus-use-right request signal generating circuit 14 for generating a bus-use-right request signal HREQ# to be output when the main circuit 17 requires the right to use the system bus SB.

When the main processor 1 issues to the LSI 12, for example, an instruction to perform a pipeline process, the main circuit 17 in the LSI 19 outputs an internal bus-use-right request signal IREQ# to a bus-use-right request signal generating circuit 18. The bus-use-right request generating circuit 18 is provided in the control unit 14 shown in FIG. 7, and it makes the bus-use-right request signal HREQ# indicate the active state to the main processor 1 when the internal bus-use-right request signal IREQ# indicates the active state. When the main processor 1 receives it, the main processor 1 makes a bus-use-right response signal HACK# indicate the active state, and the bus-use-right request signal generating circuit 18 detects according to the active state of the bus-use-right response signal HACK# that the bus-use-right request is accepted and the bus-use-right is assigned.

Assume that the main circuit 17 outputs an internal bus-use-right request signal IREQ#, the bus-use-right request signal generating circuit 18 makes the bus-use-right request signal HREQ# indicate the active state for the main processor 1, and an error occurs in the main circuit 17 when the main processor 1 has not yet answered the active state of the bus-use-right request signal HREQ#. At this time, the main circuit 17 makes an error occurrence notification signal IERR# indicate the active state. At this time, the bus-use-right request signal generating circuit 18 maintains the active state of the bus-use-right request signal HREQ# until the bus-use-right response signal HACK# indicates the active state. Then, it is detected that the bus-use-right response signal HACK# from the main processor 1 indicates the active state, and the bus-use-right request signal HREQ# is made to indicate the inactive state.

Figure 9:
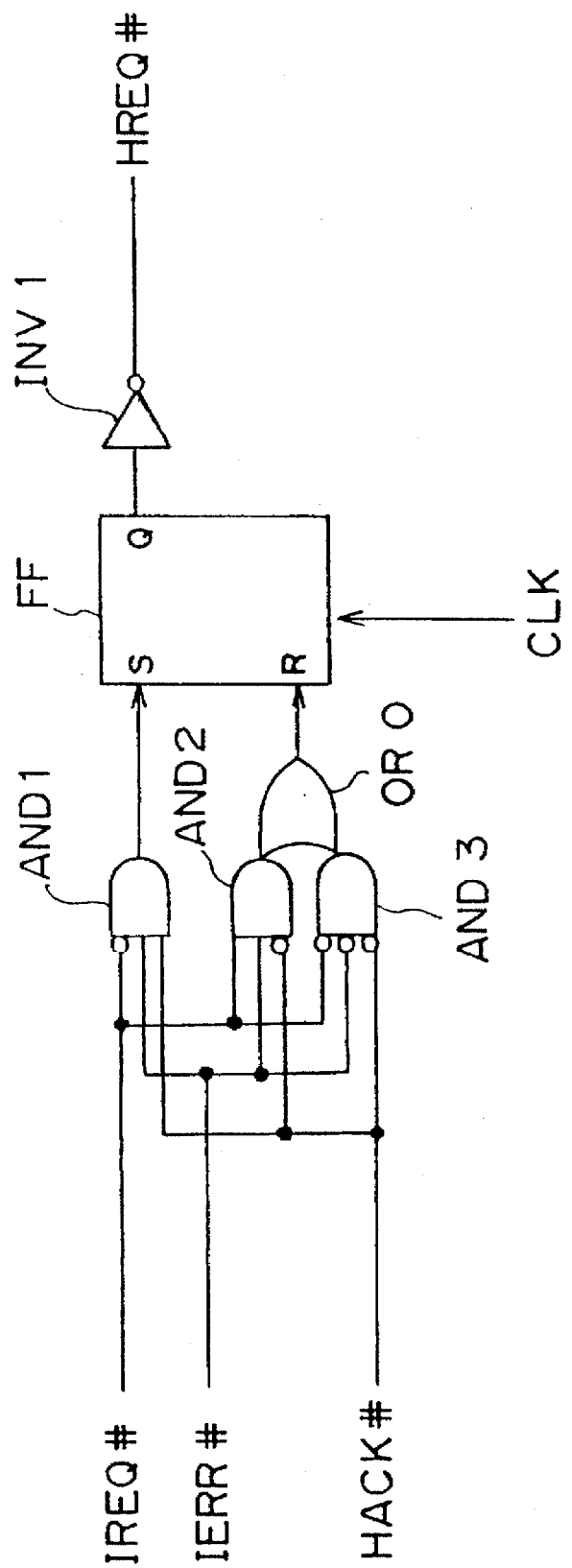
FIG. 9 shows in detail the bus-use-right request signal generating circuit of the present invention.

FIG. 9 shows in detail the bus-use-right request signal generating circuit 18 shown in FIG. 8. First, each signal is explained below.

The bus-use-right request signal generating circuit 14 comprises AND gates AND 1–3, OR gates OR 0, an RS flipflop FF, and inverter INV 1.

An internal bus-use-right request signal HACK# is applied to the inverted inputs of AND gates AND 1 and AND 3 and the non-inverted input of AND gate AND 2. An error occurrence notification signal IERR# is applied to the non-inverted inputs of AND gates AND 1 and AND 2 and the inverted input of AND gate AND 3. A bus-use-right response signal HACK# is applied to the non-inverted input of AND gate AND 1 and the inverted input of AND 3.

The output of AND gate AND 1 is applied to the set terminal (S) of the RS flipflop FF, and the outputs of AND gates AND 2 and AND 3 are applied to the reset terminals R through OR gate 0.

The output 0 of the RS flipflop turns to a bus-use-right request signal HREQ# through inverter INV 1.

In FIG. 9, a bus-use-right request signal HREQ# indicates the active state when it is at the "L" level (output to the external point of the LSI) and indicates a request for a bus use right to the main processor for managing a bus use right.

A bus-use-right response signal HACK# is a bus-use-right permission signal (input from the external point of the LSI) for indicating the active state when it is at the "L" level, and indicates that the main processor 1 for managing a bus use right has received a bus-use-right request signal HREQ# and permits the bus-use-right request.

An internal bus-use-right request signal IREQ# is an internal error signal (input from the main circuit 17) indicating the active state when it is at the "L" level, and indicates that the main circuit 17 issues a request for a bus use right.

For example, in an arithmetic operation co-processor, the signal indicates the active state when data are received from an external memory to an internal arithmetic operation unit.

An error occurrence notification signal IERR# is an internal error signal (input from the main circuit 17) indicating the active state when it is at the "L" level, and indicates that the error possibly makes a processing unit inoperative to the system bus SB. For example, in an arithmetic operation co-processor, the signal indicates the active state when an operation error has arisen internally.

A clock signal CLK is applied to the RS flipflop FF. The RS flipflop FF is set and reset in synchronizing with the clock signal CLK. Its operation is explained below. The bus-use-right request signal HREQ# from the LSI 19 indicates the active state when the RS flipflop FF is set in synchronizing with the rise of the clock signal CLK of the LSI 19.

The output 8 of the flipflop FF is provided with inverter INV 1, and the bus-use-right request signal HREQ# indicates the L level when it is made to indicate the active state by the inverter.

The operation conditions are listed in FIG. 10.

The set/reset flipflop FF is set if the internal bus-use-right request signal IREQ# indicates the L level, and the bus-use-right response signal HACK# and the error occurrence notification signal IERR# indicate the H level. That is, the set/reset flipflop FF is set if the main circuit 17 issues a bus-use-right request, no errors have arisen, and the response to the bus-use-right request has not been issued to the main circuit or other units. This makes the set/reset flipflop FF output the H level, then the L level after being inverted by inverter INV 1, and a bus-use-right request signal HREQ# to the main processor 11. In response to the L level from the set/reset flipflop FF, the main processor 11 sets the bus-use-right response signal HACK# to the L level.

The set/reset flipflop FF is reset if the internal bus-use-right request signal IREQ# and the error occurrence notification signal IERR# indicate the H level and the bus-use-right response signal HACK# indicates the L level. That is, when the bus SB is being used with no errors and there are no bus-use-right requests left. This makes the RS flipflop output the L level, and then it is inverted to the H level by the inverter. Finally, a bus-use-right request signal HREQ# is applied to the main processor 11. Since this makes the bus-use-right request signal HREQ# indicates the inactive state, the main processor 11 sets the bus-use-right response signal HACK# to the H level. Thus, the set/reset flipflop is reset when the main circuit 17 has completed the normal operation of the main circuit 17. The set/reset flipflop is also reset on other conditions. That is, it can be reset when the internal bus-use-right request signal IREQ#, the error occurrence notification signal IERR#, and the bus-use-right response signal HACK# indicate the L level. If an internal bus-use-right request is issued as shown in FIG. 10, and an error occurrence notification is output when a bus-use-right request is sent to the main processor 11, then a bus-use-right response is returned. That is, the set/reset flipflop is reset when a bus-use-right response signal HACK# indicates the L level.

Figure 11:
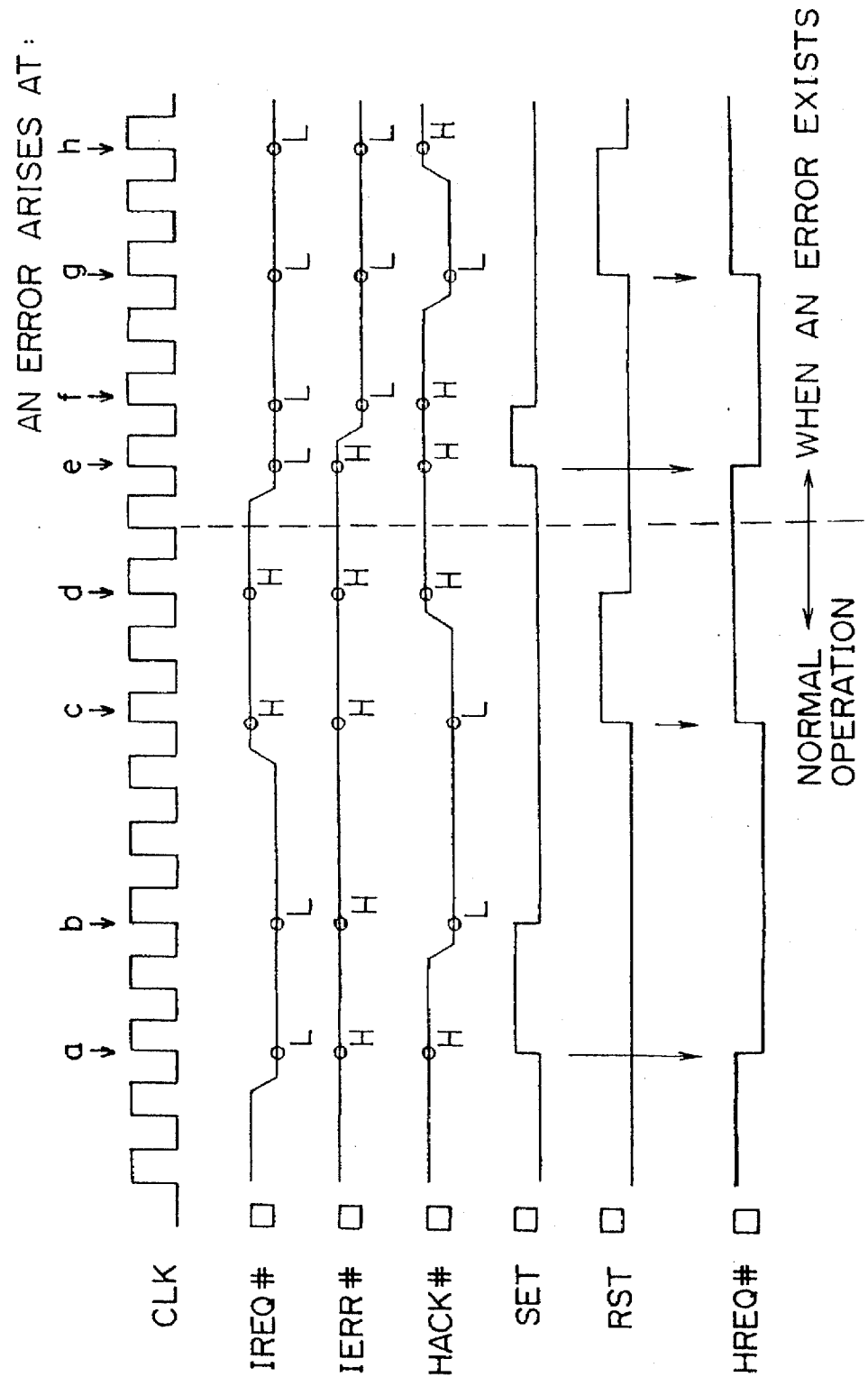
FIG. 11 is a timing chart for explaining the operation of the embodiment of the present invention.

FIG. 11 is a timing chart for explaining the operation of the embodiment of the present invention. During the normal operation, the set signal of the RS flipflop FF (output by AND gate AND 1) indicates the H level at point a to set the RS flipflop. This sets the bus-use-right request signal HREQ# to the L level. When the main processor 1 detects that the bus-use-right request signal HREQ# indicates the L level and when it assigns a bus use right, it sets the bus-use-right response signal HACK# to the L level. This releases at point b the setting of the RS flipflop. Since the RS flipflop is not reset at this time, it retains the set state.

When a bus is not required, an internal bus-use-right request signal IREQ# indicates the H level and a reset signal (output by AND gate AND 2) indicates the H level at point c and applied to the RS flipflop FF through OR gate 1. Thus, the flipflop is reset. This sets the bus-use-right request signal HREQ# to the H level. The main processor detects it and sets the bus-use-right response signal HACK# to the H level.

The normal operation of the embodiment of the present invention is described above.

The RS flipflop FF is set after it is detected that the internal bus-use-right request signal IREQ# indicates the L level at point e. Then, assume that an internal error has arisen and an error occurrence notification signal indicates the L level immediately after the notification to the main processor 11 that the bus-use-right request signal indicates the L level. At this time, a set signal indicates the L level regardless of the level of the bus-use-right response signal. However, the RS flipflop FF retains the set state. The reset signal indicates the H level and the RS flipflop FF is reset when the bus-use-right response signal HACK# indicates the L level at point g, and thus the bus-use-right request signal HREQ# indicates the H level. It is detected by the main processor 11 at point h, and determined that the bus-use-right response signal HACK# indicates the H level. Then, the bus is released.

Figure 12:
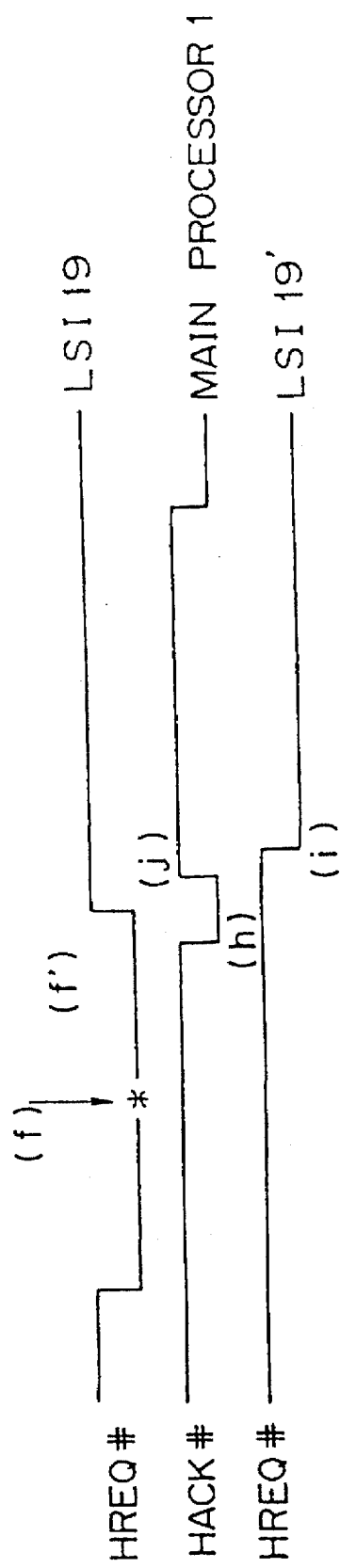
FIG. 12 is a waveform diagram for explaining the effect of the present embodiment.

The system comprising both of the LSIs 19 and 19' connected to the system bus SB is described by referring to FIG. 12.

Even if the arithmetic operations cannot be performed due to, for example, internal errors, etc. in the LSI 19 before the CPU makes the HACK# signal indicate the active state after the LSI 19 HREQ# signal indicates the active state (part f in FIG. 12), then the HREQ# signal does not indicate the inactive state until the HACK# signal indicates the active state (part h in FIG. 12). Then, the HREQ# signal from the LSI 19 indicates the inactive state (part f' in FIG. 12). In response to this, the HACK# signal indicates the inactive state (part j in FIG. 12), and the HREQ# signal of another LSI 19' surely indicates the active state (part i in FIG. 12).

That is, if an error has arisen in the LSI 19 during the bus arbitration before the HACK# signal indicates the active state after the HREQ# signal indicates the active state, then a bus-use-right request must be released after the HREQ# signal indicates the inactive state. At this time, the HREQ# signal retains the active state by an RS flipflop FF until the HACK# signal from the CPU 1 indicates the active state. Therefore, a malfunction is prevented when the HREQ# signal indicates the active state anew by the LSI 19', etc.

As described above, even if the system bus SB has become unnecessary after the output of the HREQ# signal in the embodiment of the present invention, a bus-use-right request is released after the assignment of the right to use the system bus SB is confirmed by the main processor 11. Therefore, a bus-use-right request from any of other processors (LSI 3 in this case) is rejected during the period from the moment when the system bus SB has become unnecessary to the moment when the bus-use-right request is released.

Since a bus-use-right request is released according to a bus-use-right permission signal from the main processor 11, the bus arbitration can be easily executed only by providing a logical circuit for obtaining a bus-use-right request signal HREQ# as the result of the predetermined logic obtained based on the list of a bus-use-right signal HREQ#, an error occurrence notification signal IERR#, and a bus-use-right response signal HACK# shown in FIG. 10.

Therefore, a malfunction caused by an error which has arisen during the bus arbitration can be successfully prevented, and a specific external circuit for the arbitration can be simplified effectively.

In the above described embodiment, the logical circuit comprising an RS flipflop, as an example, for generating a bus-use-right signal HREQ#. However, it is obvious that the configuration of the logical circuit is not limited to this application.

Next, the method of controlling the memory accessing device 10 of the present invention is described below. The memory accessing device 10 according to the present invention 10 has the system configuration as shown in FIG. 7, and is controlled in an address pipeline mode as in the conventional memory accessing device.

The memory accessing device 10 can use the five following methods of controlling processes in an address pipeline mode.

(1) If the main processor 1 has to use a bus:

The main processor makes a bus-use-right request signal GBR# (global bus request signal) indicate the active state to obtain a bus use right when the contents of the memory 4 are updated by transferring block data to the memory 4 to maintain the consistency between the contents of the cache in the main processor 1 and those of the memory 4. At this time, the memory accessing device 10 comprises an input terminal for receiving a bus-use-right request signal GBR# as a bus-use-right release signal BRL# (bus release signal), receives the signal GBR#, suspends the address pipeline mode, and releases the bus use right.

The memory accessing device 10 should not easily release a bus use right immediately after the bus-use-right request signal GBR#, that is, BRL#, is detected that it indicates the active state. Since an address is output in an address pipeline mode, data of the address to be output first should be processed first. That is, since the memory 4 makes an access response signal DC# indicate the active state for the number of pieces of accessed data, a bus use right should not be released until the response signal for the data of the address to be output first. If it is released before the response signal is received, the number of output addresses do not equal the number of pieces of data to be processed, which may cause a malfunction of the system.

If a bus-use-right release signal BRL# indicates the active state, then the following processes should be performed at the moment when an access response signal DC# indicates the active state. The cycle of the active state of an access response signal DC# corresponds to the address output and data input/output cycle (part 2 in FIG. 6) and the data input/output cycle (part 3 in FIG. 6).

In the address output and data input/output cycle (part 2 in FIG. 6), address outputs are immediately suspended and the data input/output cycle is started. In the data input/output cycle (part 3 in FIG. 6), addressed are not output and no processes are executed. At this time, if the access response signal DC# for the last data for the prefetched addresses, then the address pipeline mode is suspended and the bus-use-right request signal HREQ# is made to indicate the inactive state. Even if the bus-use-right release signal BRL# indicates the inactive state, a request for a bus use right is issued again with a bus-use-right request signal HREQ# if a request for memory access should be issued. If a response signal HACK# is returned, the bus access is started again.

(2) When a bus-use-right response signal HACK# indicates the inactive state due to a malfunction of a bus:

If a bus-use-right response signal HACK# indicates the active state during a bus access process, then the data for the prefetched address are processed, and then the address pipeline mode is suspended. However, even if the access response signal DC# for the last data is detected, the bus-use-right request signal HREQ# is not made to indicate the inactive state. It indicates the inactive state not because of the request from the main processor 1 to use a bus SB, but because of a malfunction in the system. However, since the bus-use-right response signal HACK# certainly indicates the inactive state, the bus use right remains released. If the bus-use-right request signal HREQ# maintains the active state, a bus access process can be immediately started again when the bus-use-right response signal HACK# indicates the active state.

(3) When an exception has arisen in the main circuit of the processing unit 16:

In this case, since it is not significant to continues a bus access process with an exception, the address pipeline mode is terminated immediately. Therefore, the number of output addresses should equal the number of pieces of data. The data for the prefetched addresses are processed, and then the address pipeline mode is terminated. That is, the process is terminated when an access response signal DC# for the last data is detected.

An internal exception can exist at any time regardless of an external bus access or the state of an access response signal DC#.

That is, an internal exception can exist in the address first-output cycle (part 1 in FIG. 6) as well as in the address output and data input/output cycle. In the cycle of outputting an address first, the output of addresses is terminated and the data for the number of the prefetched addresses are processed. In this case, the address first-output cycle is transferred to the data input/output cycle.

After an access response signal DC# for the last data is detected, the bus-use-right request signal HREQ# is made to indicate the inactive state because the bus use right is not required.

That is, since the exception is caused by a compulsory termination, the memory access process is not started again.

(4) When the memory accessing device 10 performs an address conversion:

If an error has arisen in the conversion table (TLB) 15 for converting a logical address to a physical address, it means that there are no addresses to be output. Therefore, the address pipeline mode is suspended, an entry address to enter from the external memory 4 to the conversion table (TLB) 15 is obtained.

Such an error in the conversion table is caused by an internal operation within the memory accessing device 10, and can arise at any time. Therefore, the address first-output cycle can be transferred to the data input/output cycle. That is, an internal exception can exist in the address first-output cycle (part 1 in FIG. 6) as well as in the address output and data input/output cycle. In the cycle of outputting an address first, the output of addresses is terminated and the data for the number of the prefetched addresses are processed. In this case, the address first-output cycle is transferred to the data input/output cycle. Since a series of bus accessing operations are performed in this case, the bus use right can be retained without changing the state of the bus-use-right request signal HREQ# to "inactive". After having entered the conversion table TLB, the address pipeline mode is resumed.

(5) When a bus exception has arisen:

For example, if an external circuit detects an abnormal condition such as a bus time-out, a parity error, a request for access to a prohibited unit, etc. when the memory accessing device 10 is accessing a bus, a bus error signal BERR# (bus error) is applied to a terminal for immediately terminating the address pipeline mode.

The bus error signal BERR# is detected when an access response signal DC# from the memory 4 indicates the active state. The exception in a bus is an exception response to the memory accessing device 10, and occurs regardless of an address first-output process, etc. Therefore, when an exception in a bus occurs, the memory does not make the access response signal DC indicate the active state. Accordingly, the bus access is immediately terminated without waiting for the data processes for the prefetched addresses.

Summing up, the following processes should be performed to suspend or terminate the address pipeline mode.
(a) Such signals pertaining to external factors from the main processor as a bus-use-right release signal BRL# described in (1) and a bus-use-right response signal HACK# described in (2) should be detected together with an access response signal DC# in the cycle in which an access response signal DC# is detected so that the number of the addresses of the memory access may equal the number of pieces of data.
(b) Signals pertaining to internal factors such as an internal exception described in (3) and a request for a TLB entry described in (4) should be detected with an access response signal DC# in the cycle in which an access response signal DC# is detected. However, only the factors should be detected in the address first-output process.
(c) Signals pertaining to external factors from the memory device 3 such as an exception in a bus should be detected in a cycle in which an access response signal DC# is detected.

Next, an embodiment according to the present invention and operated by the above described control method is explained below by referring to the attached drawings.

Figure 13:
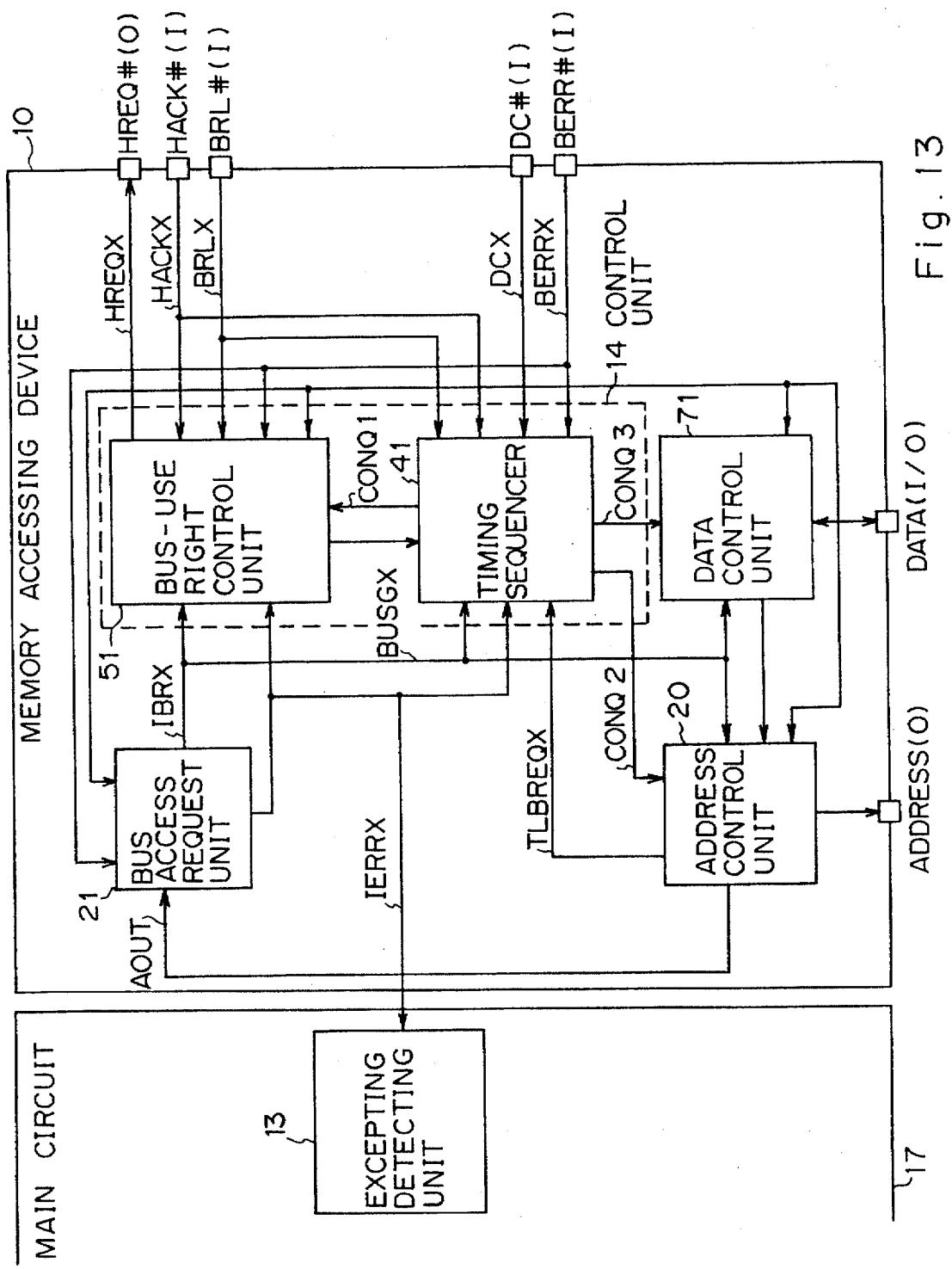
FIG. 13 shows the configuration of the memory accessing device associated with an embodiment of the present invention.

FIG. 13 shows the configuration of the memory accessing device according to the embodiment of the present invention.

In FIG. 13, the memory accessing device 10 of the present embodiment comprises the control unit 14 comprising a timing sequencer 41 and a bus use right control unit 51, a bus access request unit 21, an address control unit 20, and a data control unit 71. The main circuit 17 is provided with the exception detecting unit 13.

In FIG. 13, an external signal of the memory accessing device 10 is based on a negative logic represented by a trailing "#", while an internal signal is based on a positive logic represented by a trailing "X". That is, a bus-use-right request signal HREQ# is represented as HREQX; a bus-use-right response signal HACK# as HACKX; a bus-use-right release signal BRL# as BRLX; an access response signal DC# as DCX; and a bus error signal BERR# as BERRX. IBRX is short for an internal bus request signal; IERRX for an internal error signal; and TLBREQX for a TLB request signal.

Each component is explained below.

Figure 14:
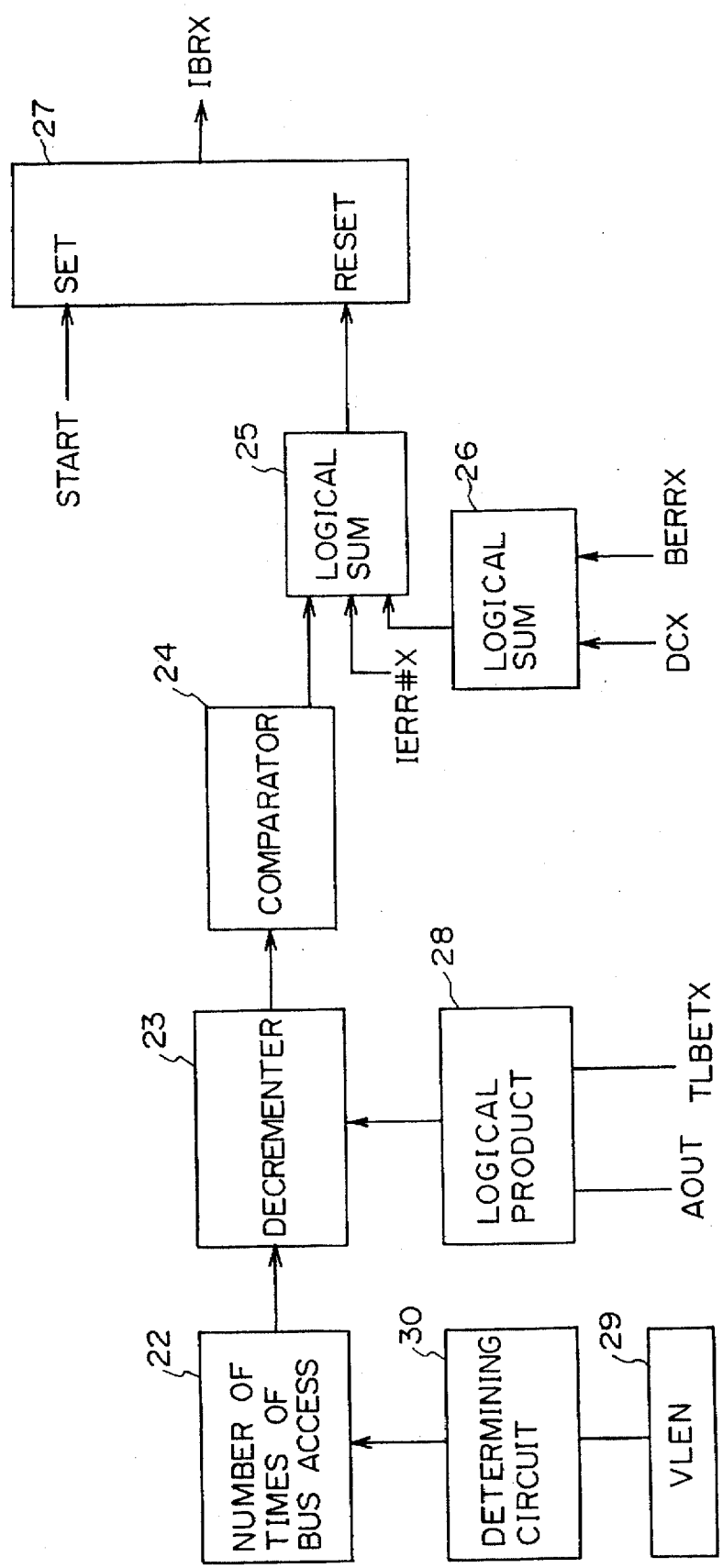
FIG. 14 shows the configuration of the circuit of the bus access request unit of the present invention.

FIG. 14 shows the configuration of the circuit of the bus access request unit 21.

Since the length of an operand depends on each instruction, the number of times of bus access depends on the process of each instruction. The bus access request unit 21 stores the number of times of bus access in the number-of-times-of-bus-access register 22. As its basic operation, after a flipflop 27 is set according to the start request signal START from an instruction or a predetermined register, a decrementer 23 is provided with the output of the number-of-times-of-bus-access register 22. When the flipflop 27 is set, the decrementer 23 receives the number of times of bus access stored in the number-of-times-of-bus-access register 22, and decrements the value each time the bus SB is accessed. Then, a bus access request signal IBRX, that is, the output of the flipflop 27, indicates the active state until the number of times of the buss access, that is, the output of a decrementer 23, indicates "1". When the bus access request signal IBRX indicates the active state, each component of the memory accessing device 10 is activated.

Thus, the number of times of bus access stored in the number-of-times-of-bus-access register 22 is usually decremented by one by the decrementer 23 each time a bus is accessed. That is, a table output signal TLBETX indicating the active state, and a bus access signal AOUT notifying the address output from the address control unit 20 (FIG. 13) and indicating the active state are applied to a logical product 28 for obtaining a logical product, and are output as an active state. On receiving the resultant active state, the value is decremented by one. At one count before the bus access is terminated (when the decrementer 23 outputs 1), the output of a comparator 24 indicates the active state, that is, the H level indicating a "matching", and the flipflop 27 is reset through the OR gate 25, and then the bus access request signal IBR# indicates the inactive state.

The number of times of bus access stored in the number-of-times-of-bus-access register 22 is determined as follows. For example, if the processing unit 16 of the embodiment of the present invention is a vector processor, then a determining circuit 30 determines the number of times of access according to the value from a vector length register (VLEN) 29 for storing the length of an arithmetic operation and a signal 64/32 for indicating the width of the bus such as 32 bits and 64 bits. The resultant value is stored in the number-of-times-of-bus-access register In addition to the output of the comparator 24, an internal exception signal IERR#X, an access response signal DCX, and a bus error signal BERRX are applied to the input terminal of a logical sum 25 through a logical product 26. When the internal exception detecting unit 13 detects an internal exception, the flipflop is reset according to an internal exception signal IERRX through the logical sum 25. If a bus exception error has arisen, then the flipflop 27 is reset when a bus error signal BERRX and an access response signal DCX indicate the active state, and the bus access request signal IBRX is made to indicate the inactive state. If the main processor 1 has to use a bus or if a request for an entry to the conversion table TLB is issued, the bus access is resumed after these processes are completed. Therefore, the bus access request signal IBRX should not indicate the inactive state.

Figure 15:
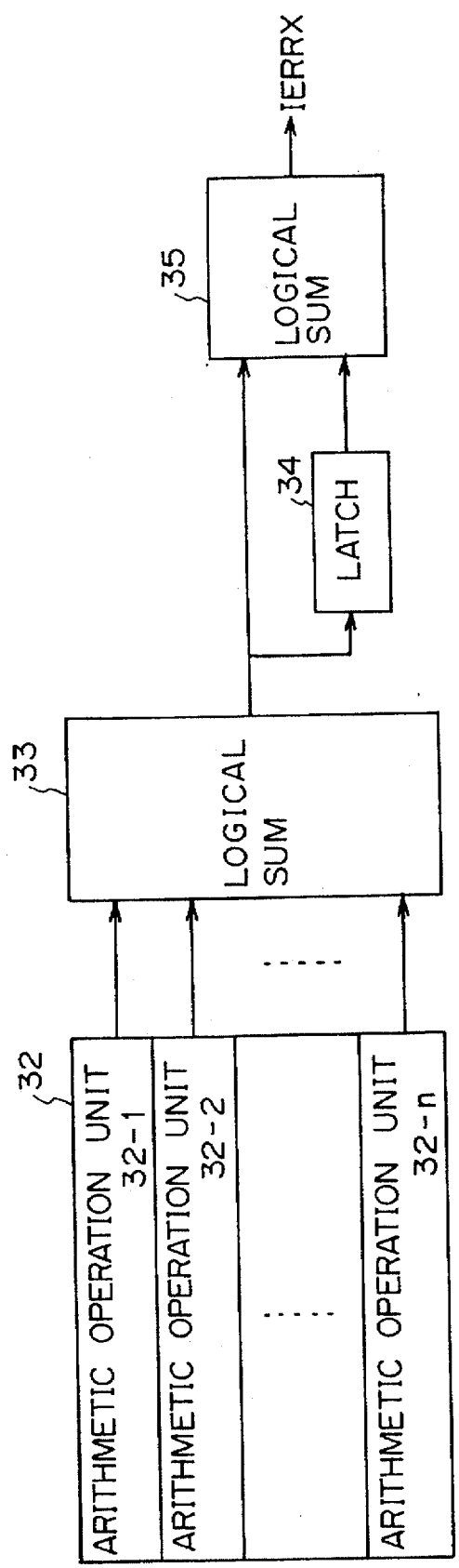
FIG. 15 shows the configuration of the circuit of the exception generating unit of the present invention.

FIG. 15 shows the configuration of the circuit of an exception detecting unit 31.

The exception detecting circuit 13 is provided in the main circuit 17 and detects exceptions generated in arithmetic operation units 32-1–32-n such as an adder, a subtracter, a divider, etc. provided in the main circuit 17. For example, the exceptions include a divisor of 0 detected by a divider, an invalid arithmetic operation containing an exceptional floating point detected by each arithmetic operation unit, etc. An exception signal generated by each arithmetic operation unit is applied to an OR gate 33 in which a logical sum is obtained, and output as an internal exception signal IERRX through a logical sum 35. The state of the internal exception signal IERRX is stored in a latch 34 until the next activation, that is, until a bus access request signal IBRX is output.

Figure 16:
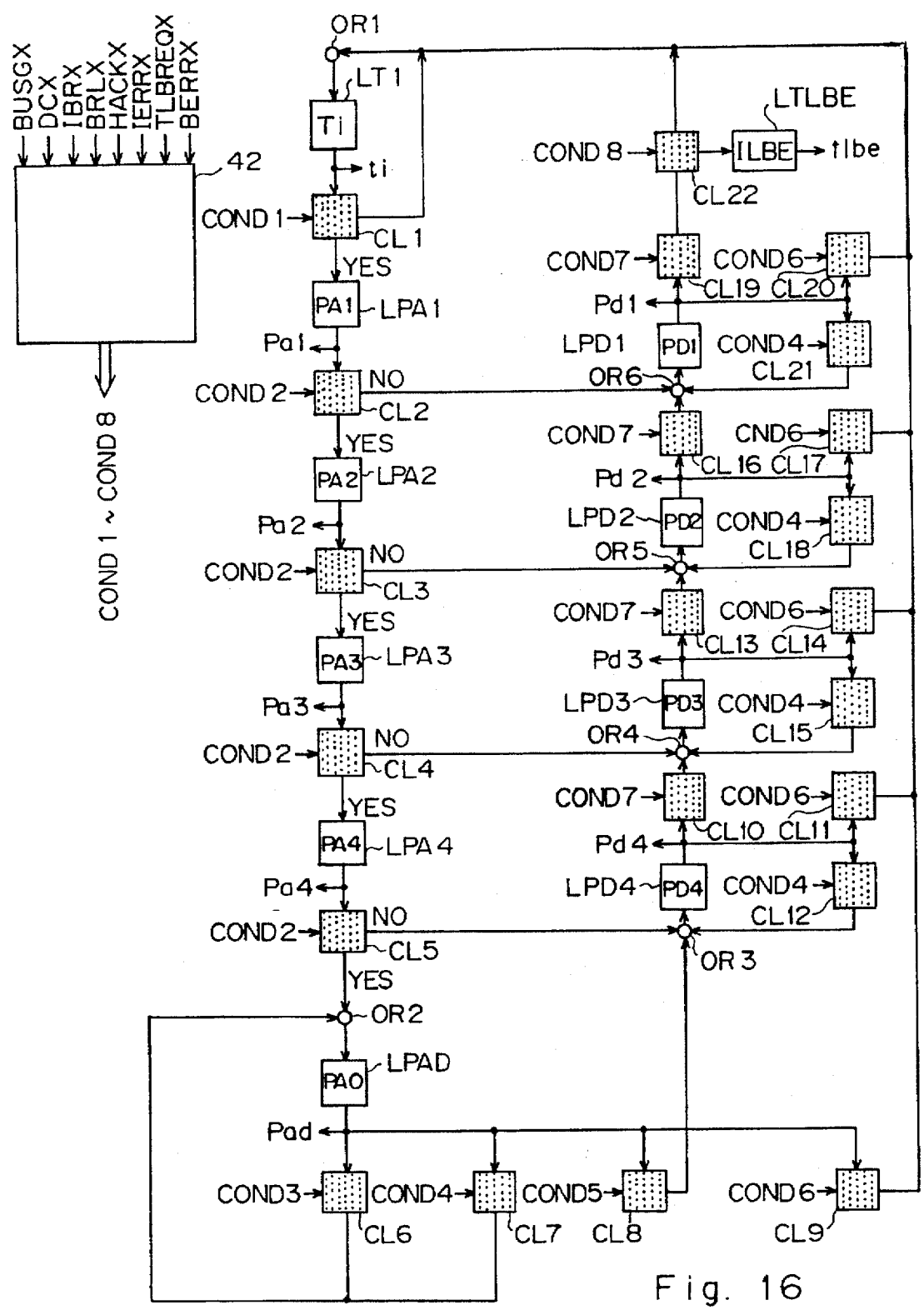
FIG. 16 shows the configuration of the circuit of the timing sequencer of the present invention.

FIG. 16 shows the configuration of the circuit of the timing sequencer 41.

Figure 1:
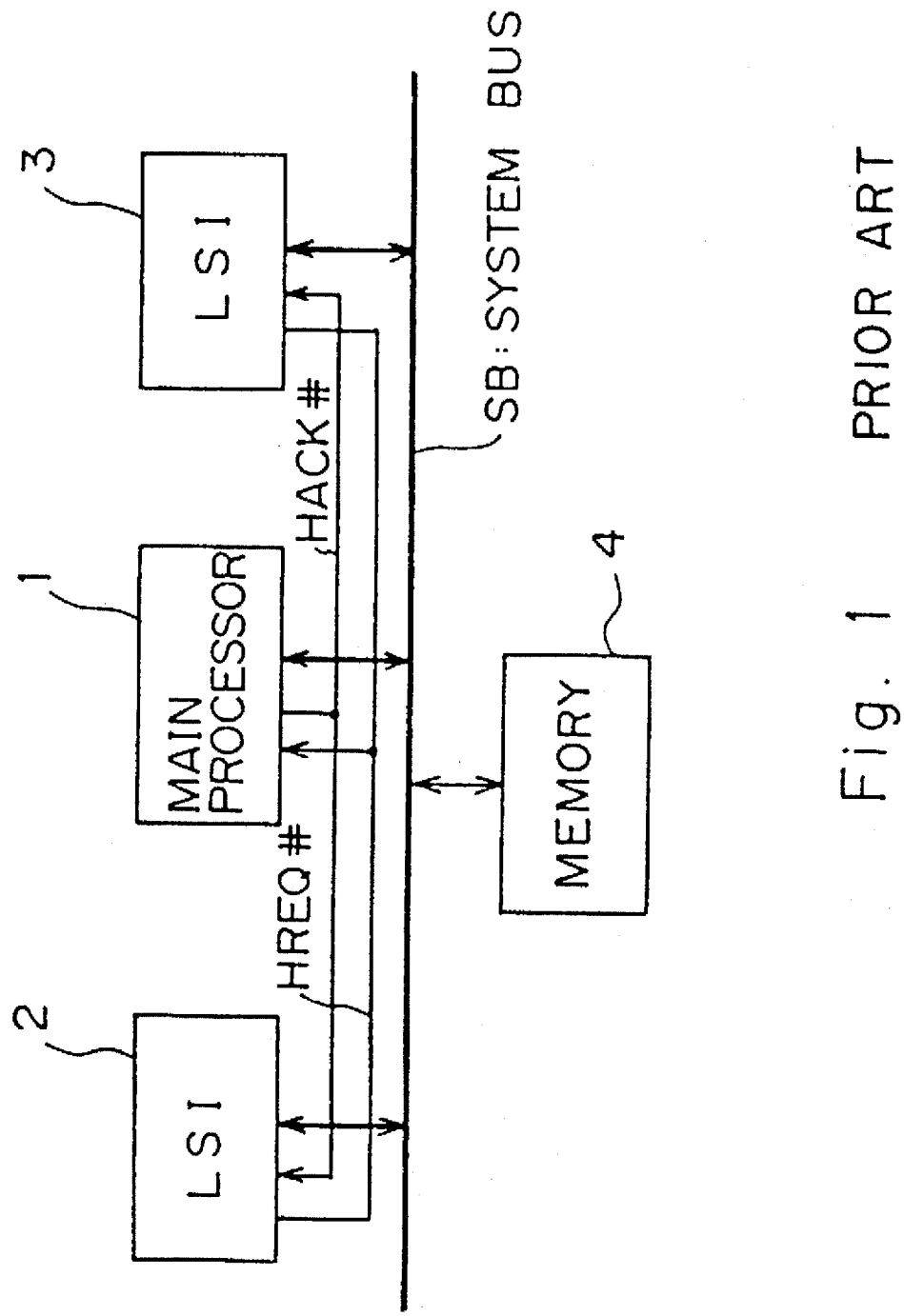
FIG. 1 is the block diagram showing the configuration of the important part of the prior art.
Figure 2:
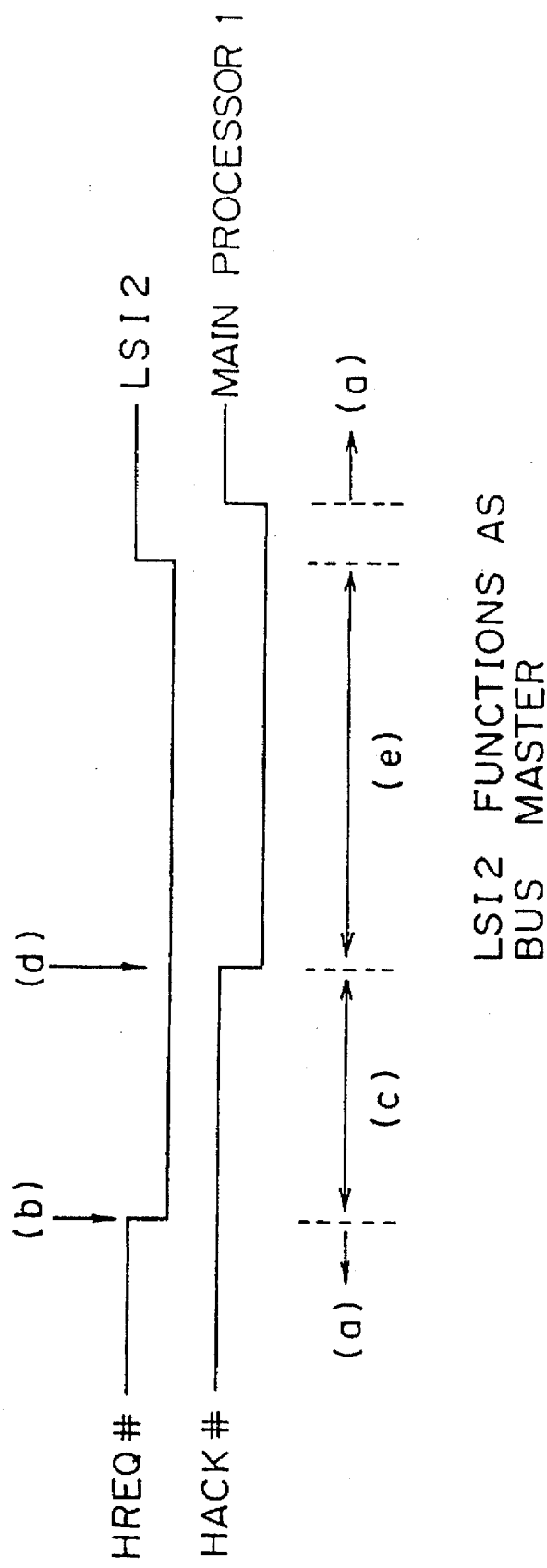
FIG. 2 shows an example of the operation of the prior art.
Figure 3:
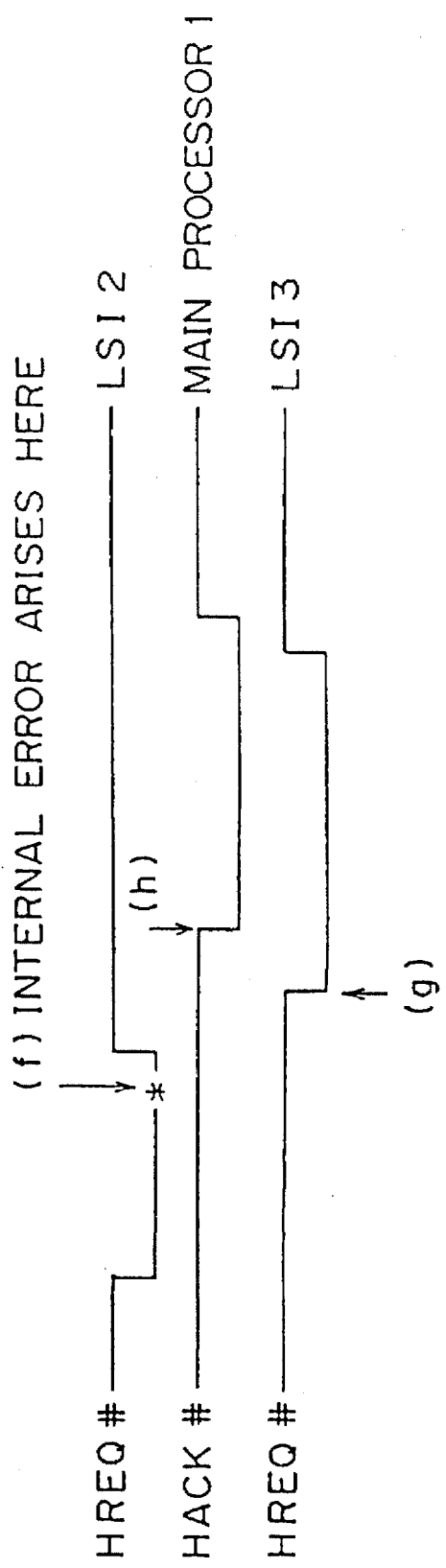
FIG. 3 shows the waveform diagram for explaining the problem of the prior art.
Figure 4:
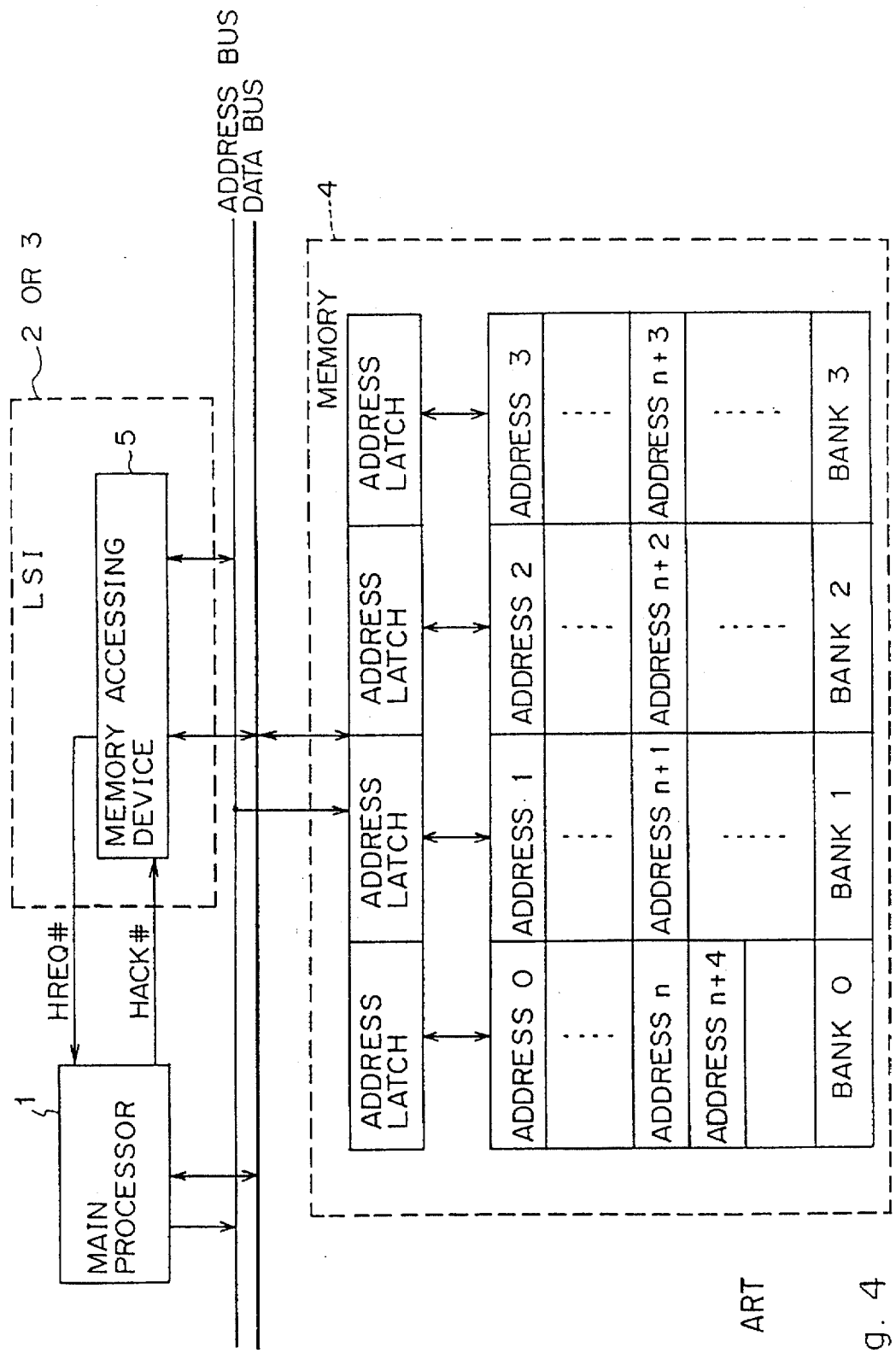
FIG. 4 shows the configuration of the conventional memory having four banks.
Figure 5:
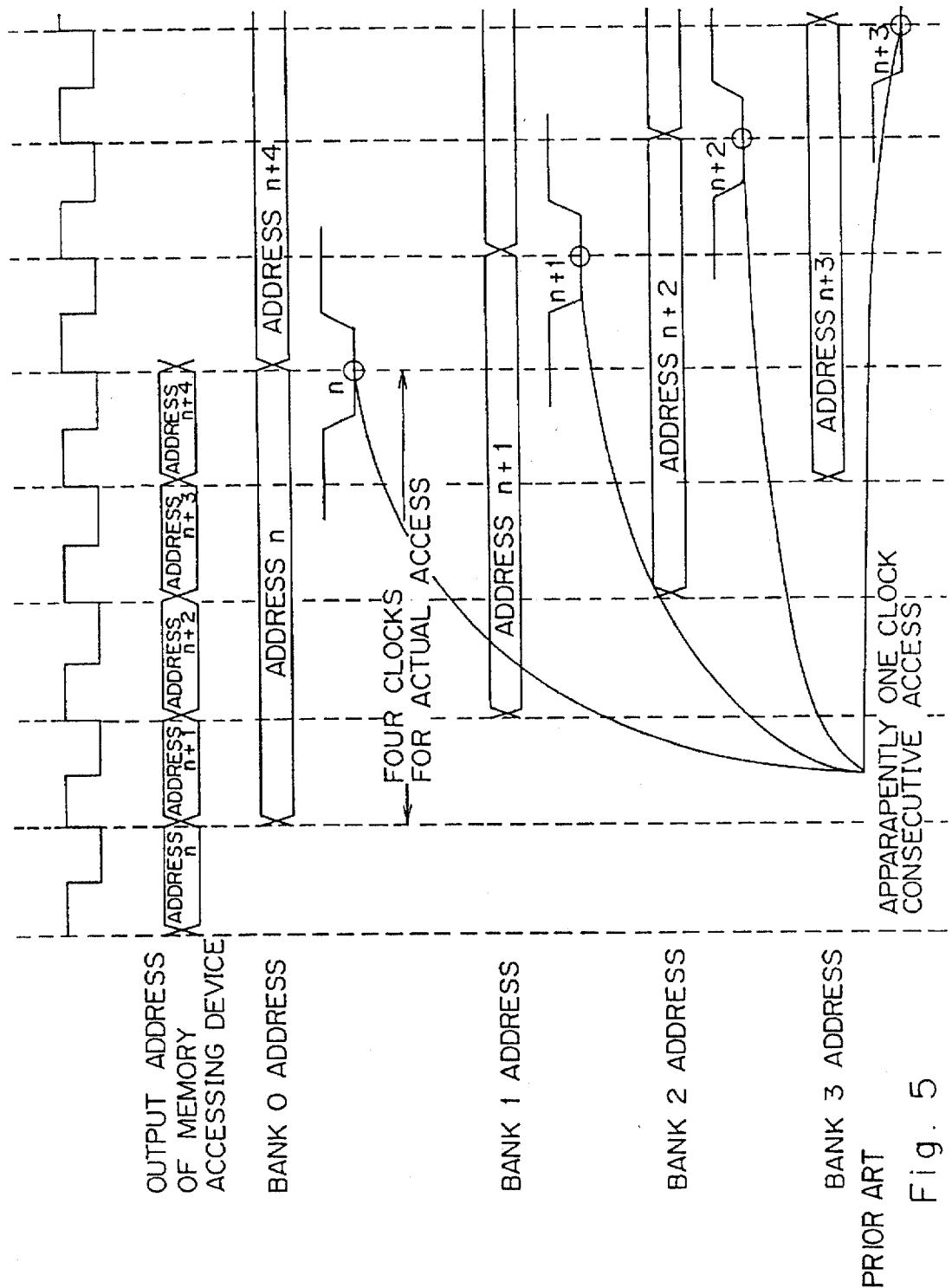
FIG. 5 is a timing chart for explaining the conventional control method in the address pipeline mode.
Figure 6:
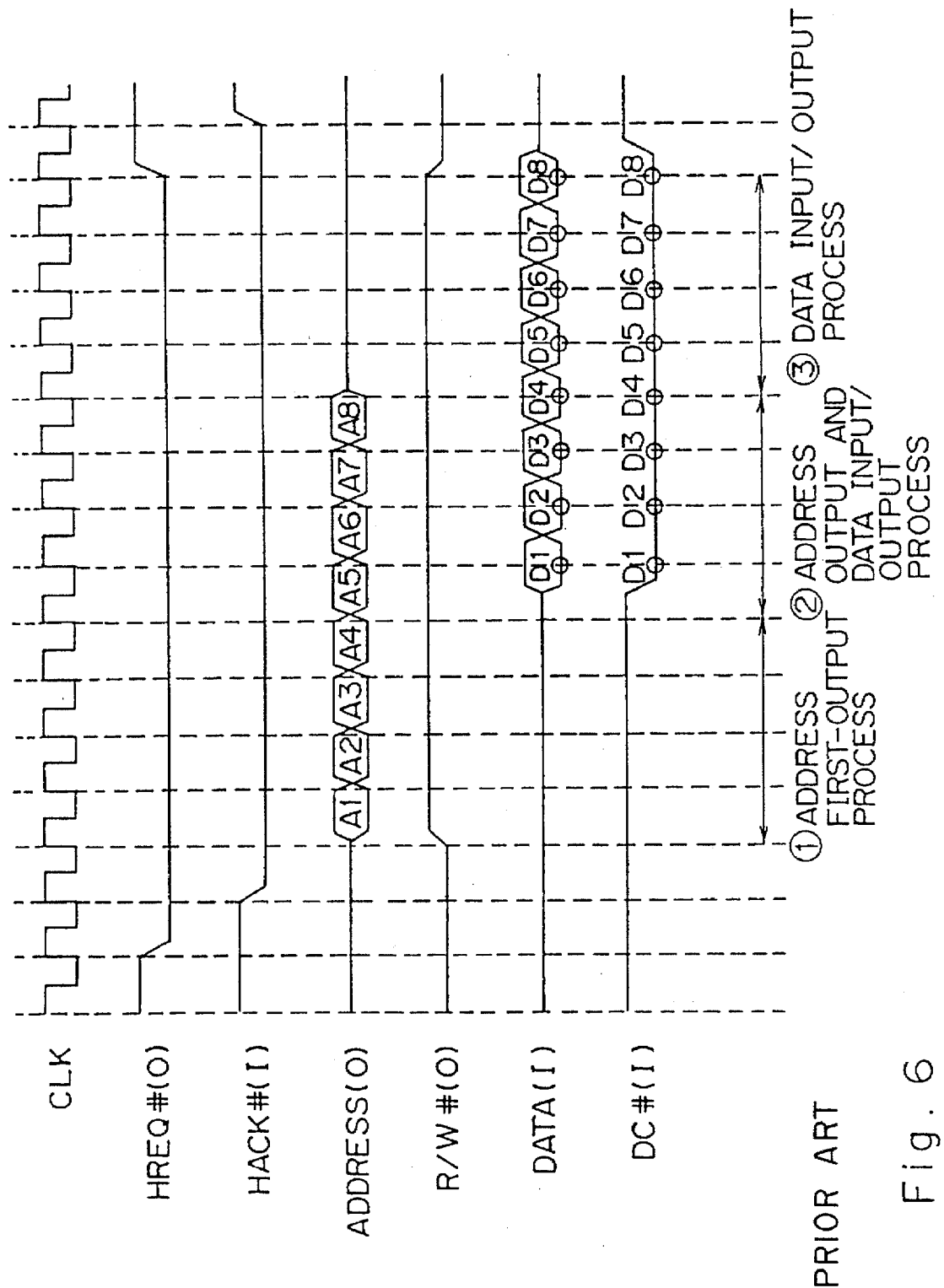
FIG. 6 is a timing chart for explaining the memory access by the conventional memory accessing device.

The timing sequencer 41 comprises latches for corresponding to the state of the bus access by the memory accessing device 1, and generates and controls the conditions for the change of the state. In this case, an address pipeline mode for first-outputting four addresses is assumed, and there are three processes as shown in FIG. 6, that is, an address first-output process (PA), an address output and data input/output process (PAD), and a data input/output process (PD). Therefore, the state of the bus access by the memory accessing device 10 can be represented by PA1–PA4, PAD, PD1–PD4, the entry state TLBE of the conversion table TLB, and the idle state Ti. Thus, the number of the states of the address first-output process PA and the data input/output process PD should match the number of prefetched addresses. In FIG. 16, LTi, LPA1–LPA4, LPAD, LPD1–LPD4, and LTLBE are latches for storing states Ti, PA1–PA4, PAD, PD1–PD4, and TLBE. ti, pa1–pa4, pd1–pd4, and tlbe are output signals of latches LTi, LPA1–LPA4, LPD1–LPD4, and LTLB. CL1–CL22 are condition determining logical circuits. OR1–OR6 are logical sum circuits.

Thus, a state machine is provided with latches LTi, LPA1–LPA4, LPAD, LPD1–LPD4, and LTLBE, and determines the changing conditions COND1–COND8 by a condition generating logical circuit 42. The conditions are determined by condition determining logical circuits CL1–CL22 for determining what state should be obtained depending on the presence/absence of a condition. Therefore, the latch of each state in the state machine is operated always only by a clock signal CLK. The outputs ti, pa1–pa4, pd1–pd4, and tlbe of the latches LTi, LPA1–LPA4, LPAD, LPD1–LPD4, and LTLBE are state signals. If they indicate the active state, then it means that the bus maintains the states Ti, PA1–PA4, PAD, PD1–PD4, and TLBE.

Figure 17:
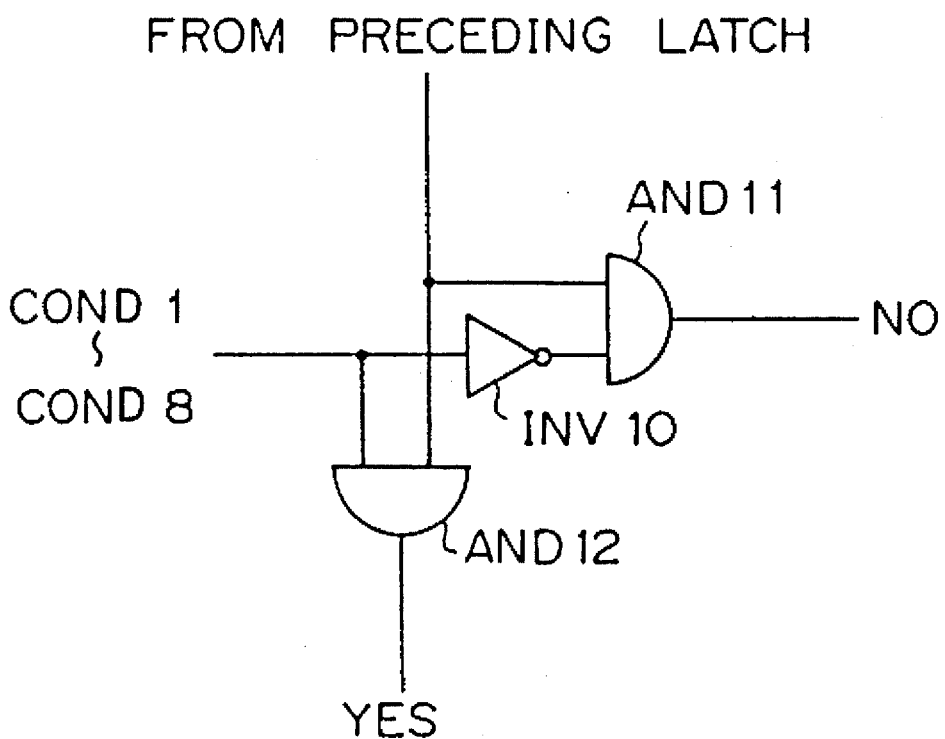
FIG. 17 shows in detail condition determining circuits of the present invention.

FIG. 17 shows in detail condition determining circuits CL1–CL22. When the H level is applied from the preceding latch, that is, if the preceding state is "active", AND gates AND11 and AND12 are turned ON, and the output of the condition generating logical circuit 42 is applied to the "Yes" terminal, or it is inverted by the inverter INV 10 and applied to the "No" terminal. That is, if the preceding latch outputs the H level and the control signals COND1–COND8 (Control signals COND1–COND8 input by each of the condition determining circuits CL1–CL22 are different from one another) output by the condition generating logical circuit 42 indicates the H level, then the H level is output to the "Yes" terminal. If the preceding latch indicates the H level and the output of the condition generating logical circuit 42 indicates the L level, then the H level is applied to a terminal named the "NO" terminal.

Figure 18:
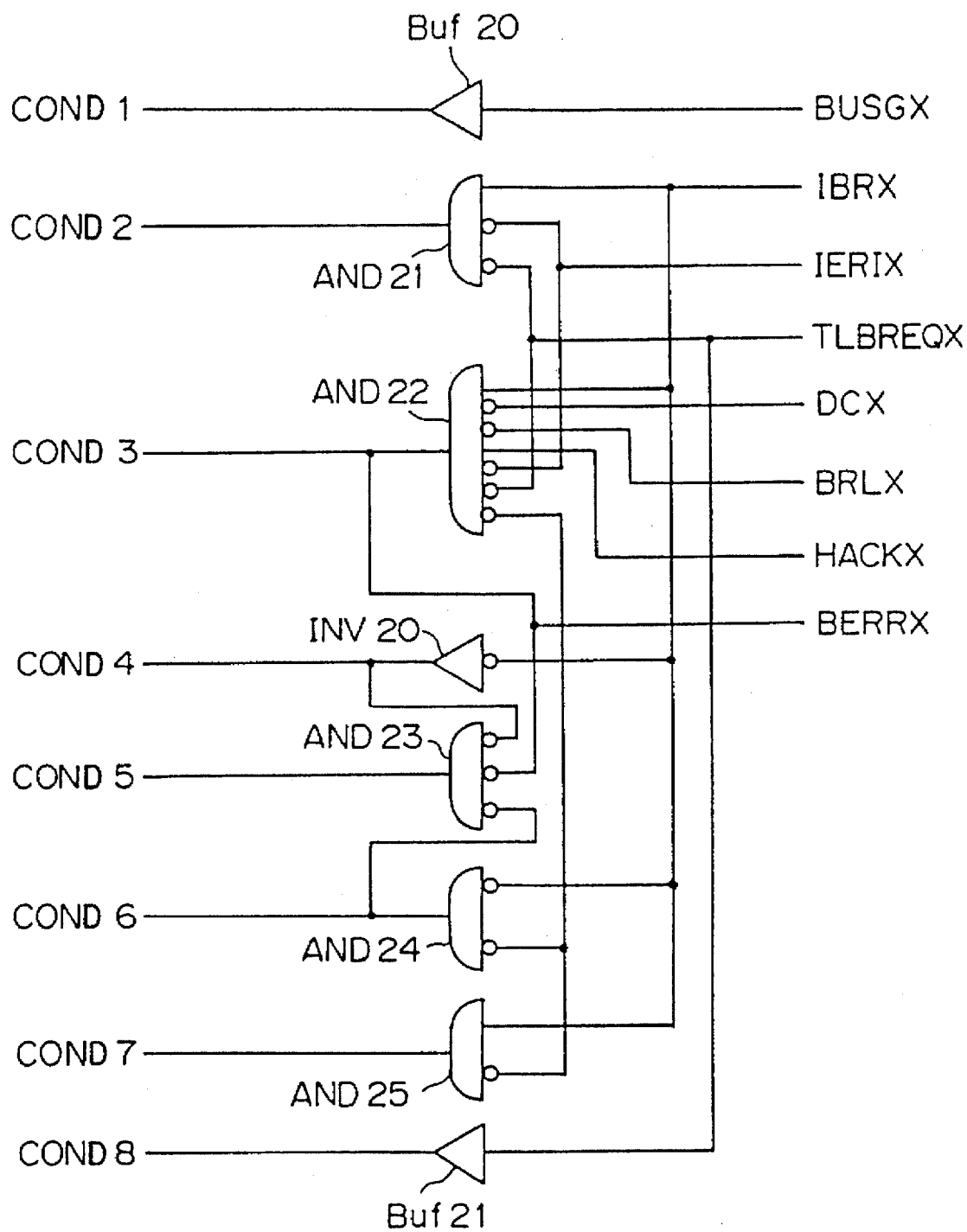
FIG. 18 shows in detail the configuration of the condition generating logical circuit of the present invention.

FIG. 18 shows in detail the configuration of the condition generating logical circuit 42. It comprises buffer Buf 20, Buf 21, And gates AND21–AND25, and the inverter INV20. These circuits selectively apply a bus-use-right get signal BUSGX, a bus access request signal IBRX, an internal exception signal IERRX, a TLB entry request signal TLBREQX, an access response signal DCX, a bus-use-right release signal BRLX, a bus-use-right response signal HACKX, and a bus error signal BERRX, and outputs a control signals COND1–COND8.

The conditions for the change of control signals COND1–COND8 generated by the condition generating logical circuit 42 are determined on the following conditions. The mark o is added to simplify the representation and indicates the active state, while the mark ● indicates the inactive state.

COND1=BUSGXo
COND2=IBRXo∩ERRX●∩TLBREQX●
COND3=DCXo∩IBRXo∩BRLX●∩HACKXo∩IERRX●∩TLBREQX●∩BERRX●COND4=DCX●
COND5=COND3●∩COND4●∩COND6●
COND6=DCX●∩BERRX●
COND7=DCXo∩BERRX●
COND8=TLBREQXo

In FIG. 16, if a bus is not accessed, then the idle state Ti is repeated, the memory accessing device 10 obtains a bus use right, and a bus access process is activated. That is, when the bus-use-right get signal BUSGX output by the bus use right control unit 51 indicates the active state, the control signal COND1 for the condition determining logical circuit CL1 indicates the active state, and the state is changed to PA1.

In the state PAi (i=1 through 4), if there are no exceptions or no entry requests for the conversion table TLB, and the bus access request signal IBRX indicates the active state, then the control signal COND2 indicates the active state, and the state is changed to PAi+1 (PAD if PA4). Otherwise, the state is changed to PDi.

In the state PAD, if the access response signal DCX indicates the inactive state, or if the cause of the problems (1) through (5) described above has not occurred even if the access response signal DCX and the bus access request signal IBRX indicate the active state, then the control signals COND4 and COND3 indicate the active state and the state PAD is retained. If the access response signal DCX and the bus error signal BERRX indicate the active state, then the control signal COND6 indicates the active state and the state is changed to the idle state Ti. Otherwise, the control signal COND5 indicates the active state, and the state is changed to PD4.

In the state PDi, if the access response signal DCX indicates the inactive state, then the control signal COND4 indicates the active state, and the state PDi is retained. If the access response signal DCX indicates the active state and the bus error signal BERRX indicates the inactive state, then the control signal COND7 indicates the active state, and the state is changed to PDi+1. If the access response signal DCX the bus error signal BERRX indicate the active state, then the control signal COND6 indicates the active state and the state is changed to the idle state Ti.

If an internal exception has occurred or a request for an entry to the conversion table TLB is issued during the address first-output cycle, then control should immediately enter the data input/output cycle. Therefore, the state is changed from PAi to PDi in which the data input/output operations are performed for the number of prefetched addresses. If, for example, the number of times of bus access is smaller than that of the prefetched addresses, then the bus access request signal IBRX indicates the inactive state during the address first-output cycle. Therefore, the state is changed from PAi to PDi in which the data input/output operations are performed for the number of prefetched addresses.

In the address output and data input/output cycle, the cycle is continued while the bus access request signal IBRX indicates the active state, but is transferred to the data input/output cycle when the bus access request signal IBRX indicates the inactive state. For example, if the bus-use-right response signal HACKX indicates the inactive state even if the bus access request signal IBRX indicates the active state in the cycle (state PAD), or if the bus release signal BRLX indicates the active state, then control is transferred to the data input/output cycle (state PD4).

In the address output and data input/output cycle (state PAD) and in the data input/output cycle (state PDi), if the bus error signal BERRX indicates the active state when the access response signal DCX indicates the active state, then control is transferred to the idle state Ti in which no actions are unconditionally taken.

Figure 19:
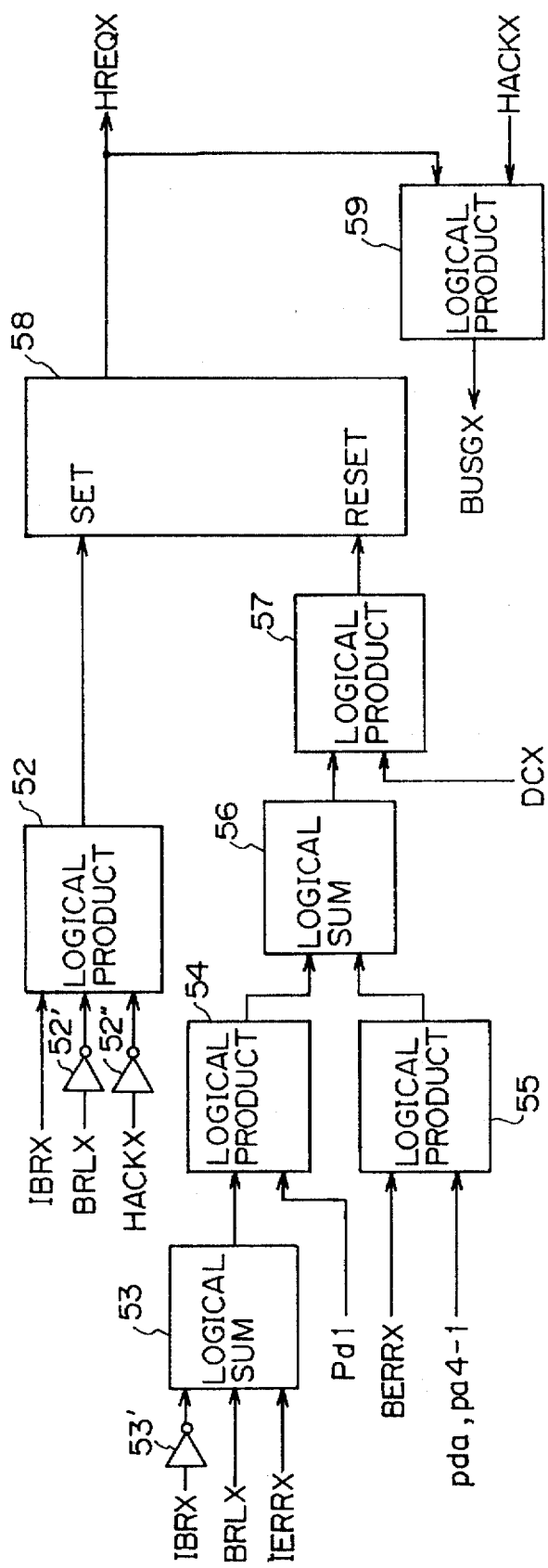
FIG. 19 shows the configuration of the circuit of the bus-use-right control unit of the present invention.

FIG. 19 shows the configuration of the circuit of the bus-use-right control unit 51.

The bus-use-right control unit 51 comprises a flipflop 58 and the bus-use-right request signal HREQX indicates the active/inactive state according to the settings of the flipflop 58. A gate circuit 59 obtains a logical product of the bus-use-right request signal HREQX and the bus-use-right response signal HACKX. If the bus-use-right response signal HACKX indicates the active state while the bus-use-right request signal HREQX indicates the active state, then it is determined that a bus use right is assigned and the bus-use-right get signal BUSGX indicates the active state.

The bus-use-right request signal HREQX can indicate the active state, that is the flipflop 58 can be set, if the bus access request signal IBRX indicates the active state while the bus-use-right release signal BRLX and the bus-use-right response signal HACKX indicate the inactive state. The logical product of these signals can be obtained by a gate circuit 52 and inverters 52' and 52". The bus access request signal IBRX is directly applied and the bus-use-right release signal BRLX and the bus-use-right response signal HACKX are applied through inverters 52' and 52'. Thus, obtained are the signals meeting the above described set condition.

The bus-use-right request signal HREQX can indicate the inactive state, that is the flipflop 58 can be reset, if the bus access request signal IBRX indicates the inactive state, the bus-use-right release signal BRLX indicates the active state, or an internal exception is detected and the internal exception signal IERRX indicates the active state while the access response signal DCX indicates the active state and the state signal PD1 indicating the last cycle output by the timing sequencer 41. Furthermore, it indicates the inactive state if the access response signal DCX and the bus error signal BERRX indicate the active state while the state signals pda and pa1–pa4 output by the timing sequencer 41 indicate the active state, that is, when the memory accessing device 1 is in the position to detect the access response signal DCX. These conditions can be determined by logical sum calculating gate circuits 53, 56, and logical product calculating gate circuits 54, 55, and 57. That is, the bus access request signal IBRX is inverted by inverter 53', and the logical sum of the bus-use-right release signal BRLX and the internal exception signal are obtained and applied to the gate circuit 53. The output of the gate circuit 53 and a state signal pd are applied to the gate circuit 54 for obtaining a logical product. Then, the bus error signal BERRX and a state signals pda and pa1–pa4 are applied to the gate circuit 55 for obtaining the logical product. The logical sum of the outputs of the gate circuits 54 and 55 are obtained by the gate circuit 56. The logical product of the output of the gate circuit 56 and the access response signal DCX is obtained by the gate circuit 57, and its output is stored as the reset signal of the set/reset flipflop.

Thus, the active/inactive state of the bus-use-right release signal BRLX determines the active/inactive state of the bus-use-right request signal HREQX, while the bus-use-right response signal HACKX does not make the bus-use-right request signal HREQX indicate the inactive state even if the bus-use-right response signal HACKX indicates the inactive state when the bus-use-right request signal HREQX indicates the active state.

Figure 20:
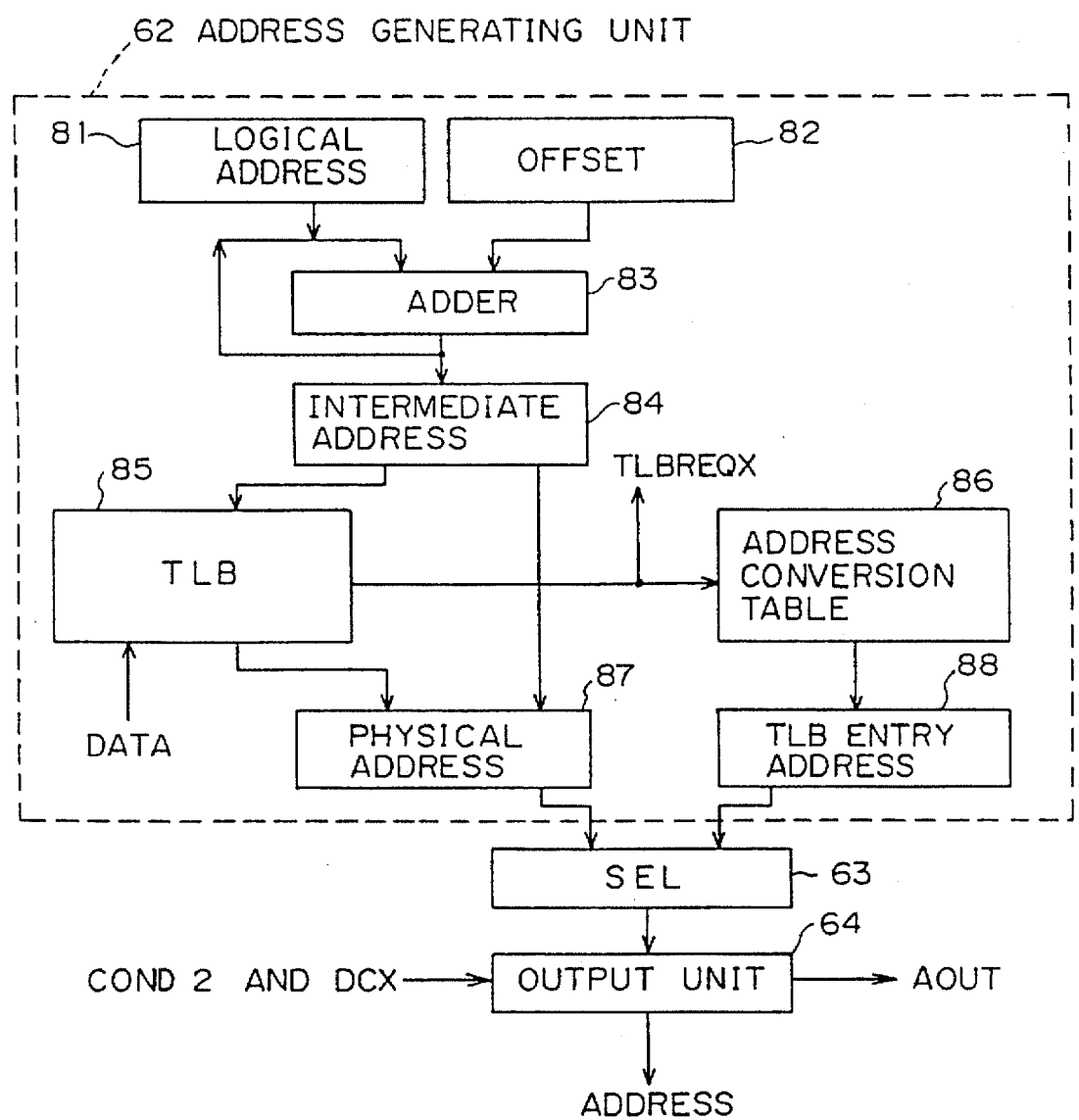
FIG. 20 shows the configuration of the circuit of the address control unit of the present invention.

FIG. 20 shows the configuration of the circuit of the address control unit 20.

The address control unit 20 comprises an address generating unit 62, a selector 63, and an output unit 64. In the normal operation, the address generating unit 62 adds using an adder 83 the logical address set in a logical address register 81 and the offset value in an offset register 82, sets the sum in a register 84 as an intermediate address. The output of the adder 83 is re-entered as a logical address. The logical address and an offset value are sequentially added to output from the adder 83 the address incremented by the offset. The higher order address of the register 84 is converted to a physical address using the conversion table TLB, or the lower order address is used as a physical address as is. These addresses are set in a physical address register 87, selected by the selector 63, and output as an address output (0) to the bus through the output unit 64.

The output of the output unit 64 is controlled by the state signals COND2 from the timing sequencer 41, Pa1–Pa4, and the access response signal DCX. When output addresses are ready, they are output according to the state signals PA1–PA4 and the access response signal DCX indicating the active state in the address first-output cycle, and according to the state signal PAD and the access response signal DCX indicating the active state in the address output and data input/output cycle.

If a TLB error arises at the start or during the bus access, the TLB entry request signal TLBREQX indicates the active state, and the timing sequencer 41 is notified to suspend the address pipeline mode. In the TLB entry cycle (state TLBE), an address to be stored in the memory 3 for the entry from an address conversion table 86 to the conversion table TLB, that is, a TLB entry address is generated and stored in the TLB entry address register 88. At this time, the selector 63 selects the output of the TLB entry address register 88, and outputs an address through the output unit 64. Thus, the bus access is performed, and the contents of address data are entered in the conversion table TLB 85 through the data bus.

The output of the output unit 64 is controlled according to the state signal TLBE from the timing sequencer 41, and an address is output according to the state signal TLBE indicating the active state.

Figure 21:
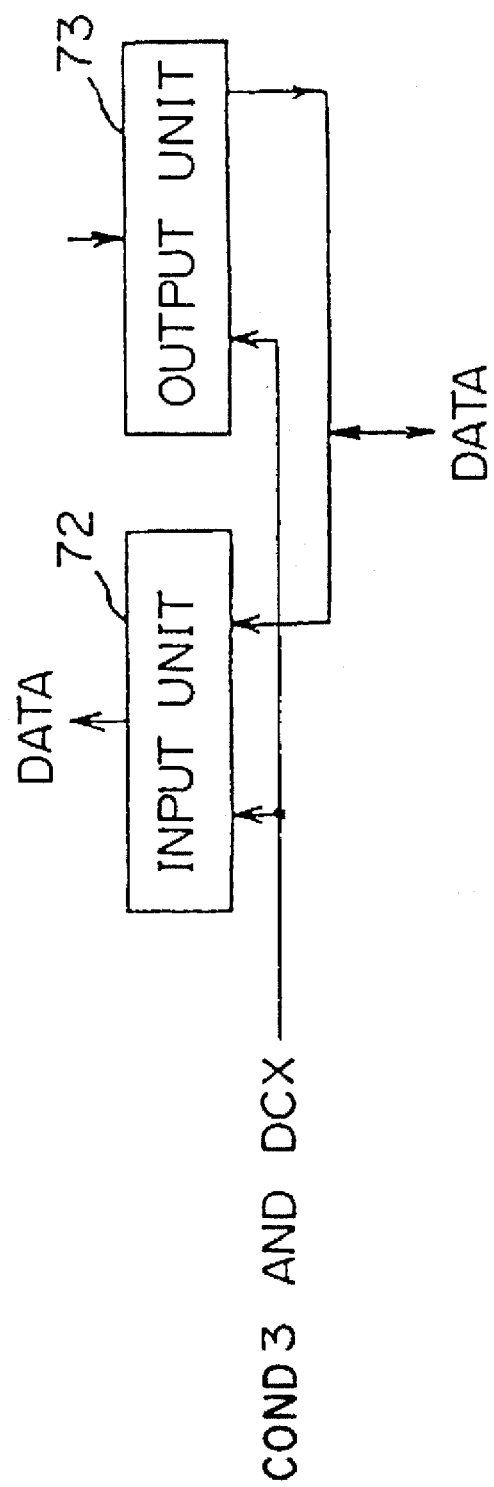
FIG. 21 shows the configuration of the circuit of the data control unit of the present invention.

FIG. 21 shows the configuration of the circuit of the data control unit 71.

The data control unit 71 comprises the input unit 72 and the output unit 73 and is controlled according to the state signals COND3 from the timing sequencer 41 and the access response signal DCX. The state signals COND3 are state signals pad indicating the address output and data input/output cycle and the state signals pd1–pd4 indicating the data input/output cycle.

Next, the operation of the memory accessing device 10 of the present invention is explained below. First, the case in which the main processor should immediately use a bus according to a bus-use-right release signal BRL#, etc. is explained.

Figure 22:
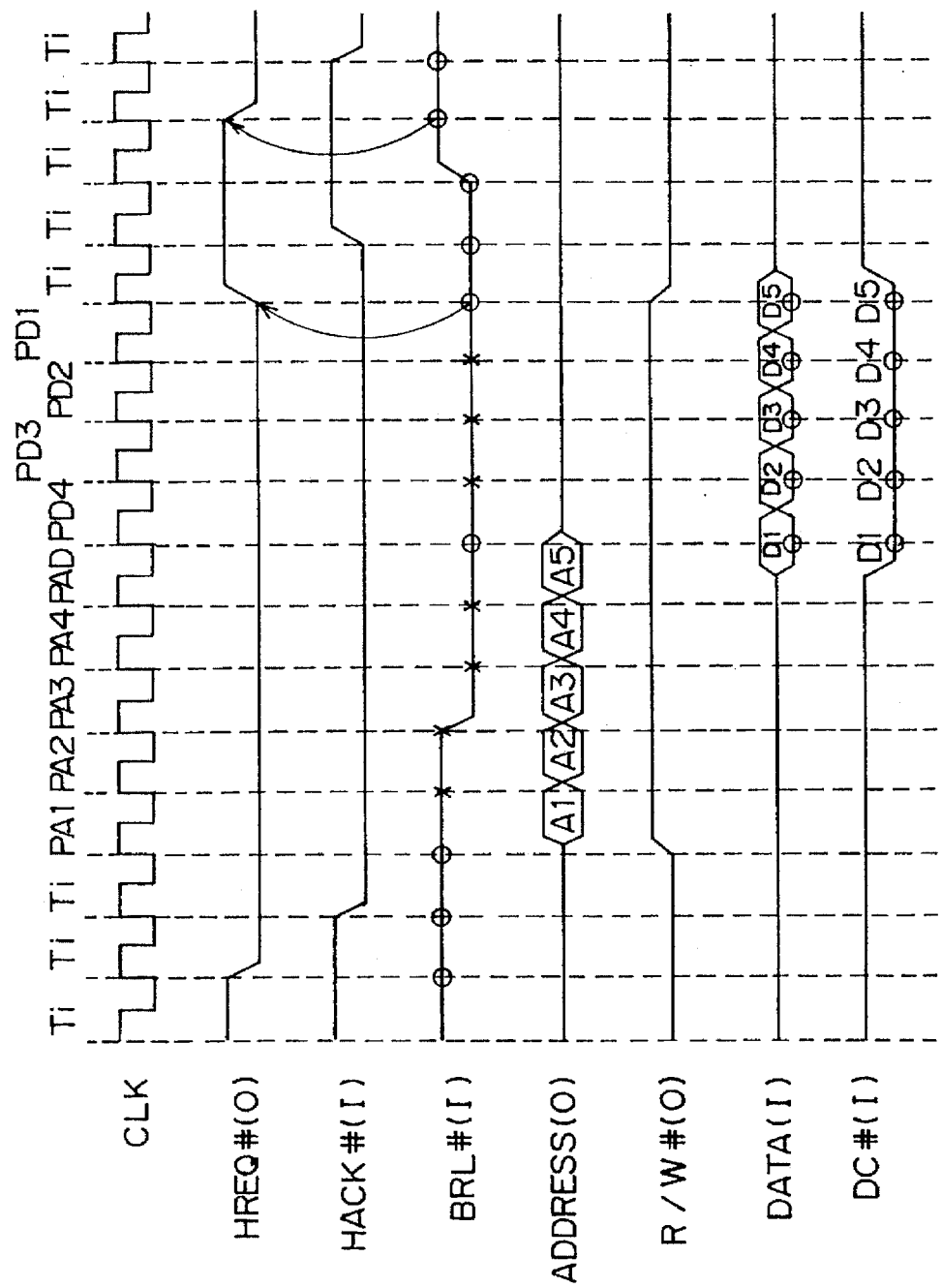
FIG. 22 is the timing chart for explaining the operation performed when the main processor 1 of the present invention should use the bus.

FIG. 22 is the timing chart for explaining the operation performed when the main processor 1 should use the bus. In this case, the bus-use-right release signals BRL#, etc. are detected with the access response signal DC# in the cycle in which the access response signal DC# is detected so that the number of memory access addresses equal that of the pieces of the data to be processed. If it is the address output and data input/output cycle, the address output is immediately suspended and control is transferred to the data input/output cycle. When the access response signal DC# for the last data D5 corresponding to the prefetched addresses is detected, the address pipeline mode is suspended and the bus-use-right request signal HREQ# is made to indicate the inactive state. Even if the bus-use-right release signal BRL# indicates the inactive state, a request for a bus use right can be issued according to the bus-use-right request signal HREQ# only if there is any request for memory access, and the bus access is resumed when a response signal HACK# is returned in response to the request. When the bus-use-right response signal HACK# indicates the inactive state due to a malfunction of the bus, the bus-use-right release signals BRL#, etc. are detected with the access response signal DC# in the cycle in which the access response signal DC# is detected so that the number of memory access addresses equal that of the pieces of the data to be processed. If it is the address output and data input/output cycle, the address output is immediately suspended and control is transferred to the data input/output cycle. When the access response signal DC# for the last data D5 corresponding to the prefetched addresses is detected, the address pipeline mode is suspended. In this case, the bus-use-right request signal HREQ# does not indicate the inactive state.

The case in which an exception has arisen in the memory accessing device 10 is explained below.

Figure 23:
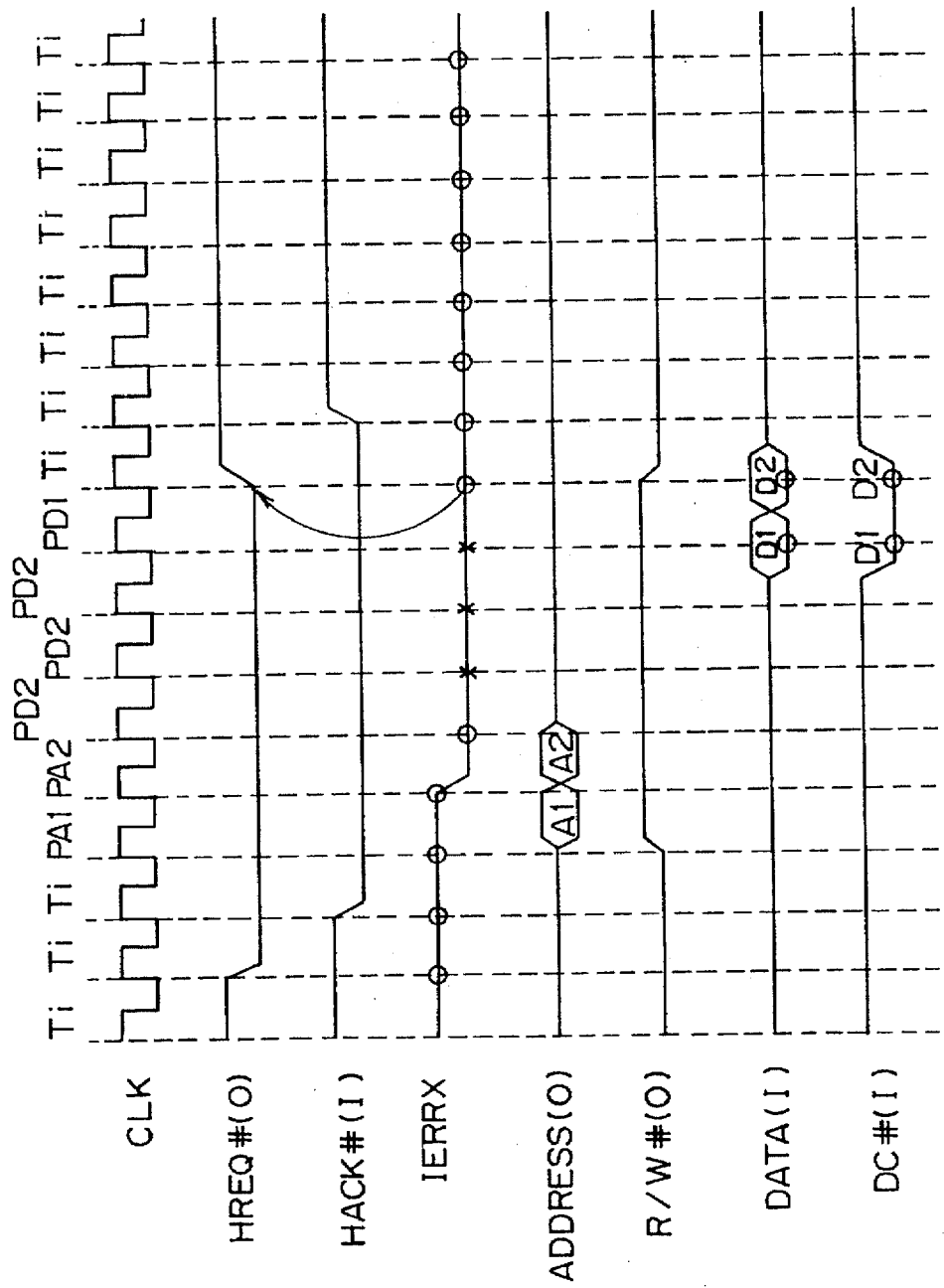
FIG. 23 is the timing chart for explaining the operation performed when an exception has arisen in the memory accessing device of the present invention.

FIG. 23 is the timing chart for explaining the operation performed when an exception has arisen in the memory accessing device 10.

In FIG. 23, the bus-use-right request signal HREQ# indicates the inactive state. Since the exception is the cause for the compulsory termination of the process in this case, the bus access is not resumed.

The memory accessing device 10 performs the address conversion when an internal exception signal IERRX indicates the active state in the address first-output cycle. In this case, the address first-output cycle is immediately suspended, the access response signal DC# corresponding to the last data D2 is detected, and then data are entered to the conversion table TLB. When the entry is completed, the address pipeline mode is resumed. During the above described process, the bus-use-right request signal HREQ# does not indicate the inactive state.

The case in which an external factor from the memory 4 has caused an exception in a bus is explained next.

Figure 24:
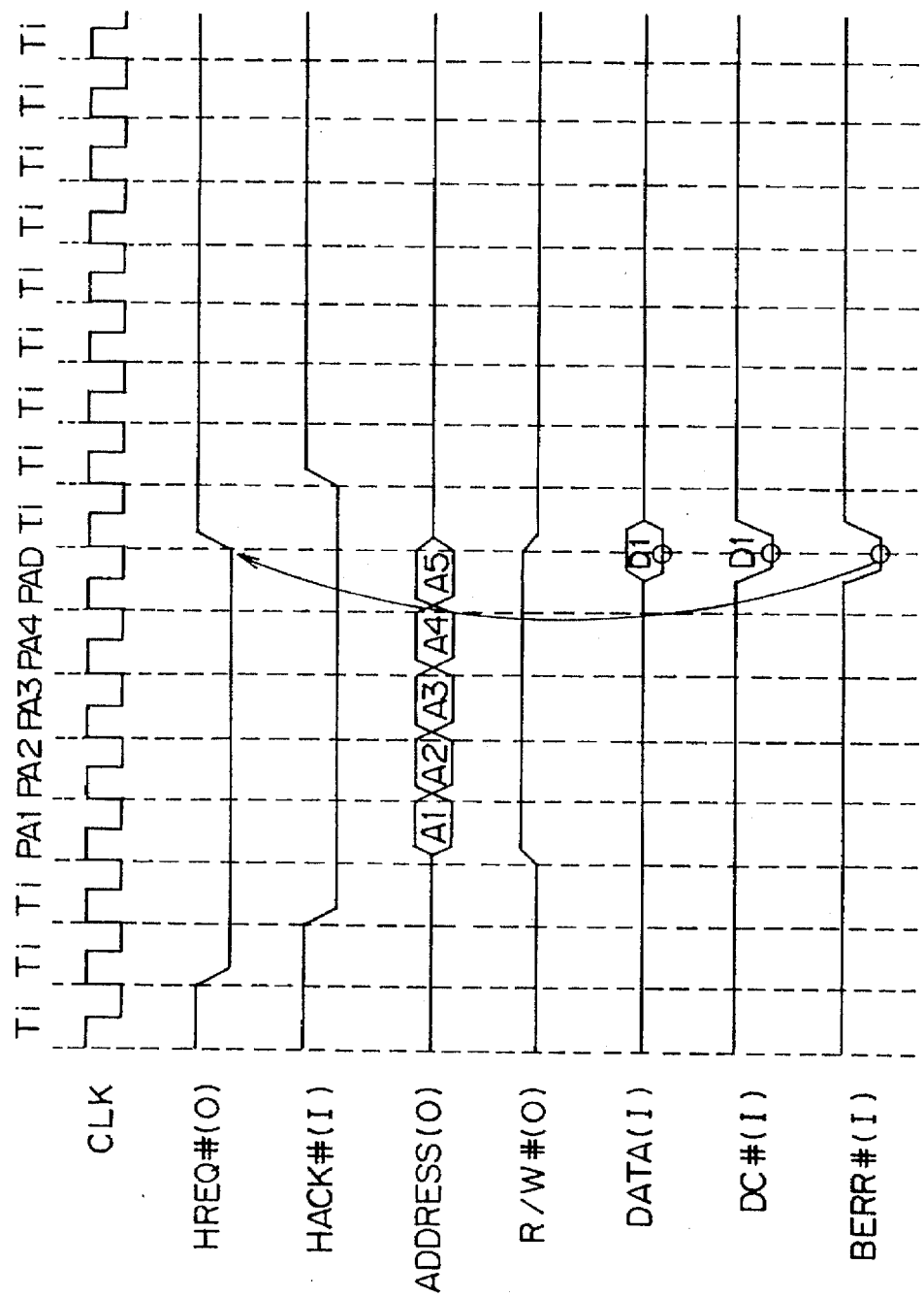
FIG. 24 is the timing chart for explaining the operation of the present invention performed when an exception has arisen in a bus.

FIG. 24 is the timing chart for explaining the operation performed when an exception has arisen in a bus.

In this case, a bus error signal BERR# is detected in the cycle in which an access response signal DC# is detected. The exception in a bus is an exception response to the memory accessing device 10, and arises regardless of the address first-output process, etc. Therefore, the bus access is immediately terminated without waiting until the data corresponding to the prefetched addresses are processed.

Figure 25:
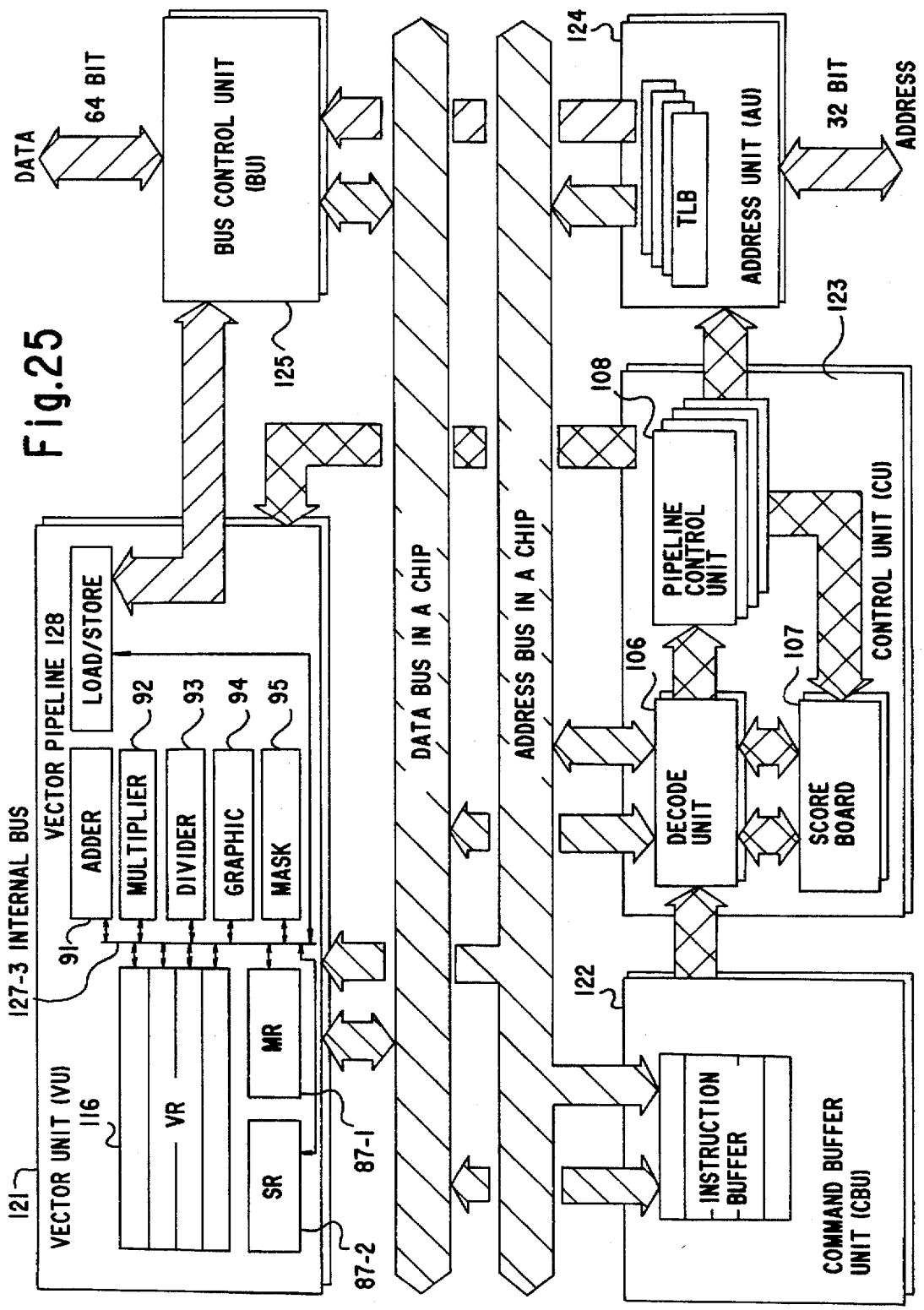
FIG. 25 shows the configuration of the vector processor unit of the present invention.

FIG. 25 shows the configuration of the vector processor unit (VPU) comprising the memory accessing device 10 of the embodiment according to the present invention.

The vector processor unit (VPU) comprises a vector unit (VU) 121, a command buffer unit (CBU) 122, a control unit (CU) 123, an address unit (AU) 124, and a bus control unit (BU) 125. The control unit 14 in the memory accessing device 10 shown in FIG. 7 is contained in the vector unit 121, the command buffer unit 122, the control unit 123, and the bus control unit 125. The address unit 124 comprises the output address generating unit 11 and the address control unit 12.

The vector unit 121 performs a vector operation and comprises a vector pipeline 128 containing an 8 KB vector register (VR) 126, a 64-byte mask register (MR) 127-1, a 128-byte scalar register (SR) 127-2, an adder 91, a multiplier 92, a divider 93, a graphic processor 94, a mask processor 95, and a load/store pipe 96 for storing and reading to the register, and is connected through an internal bus 127-3. The vector unit 121 functions as the important part of the vector processor unit.

The central processing unit, that is, the main processor 1, shown in FIG. 7 and the vector processor unit VPU, that is, the processing unit 16, are connected by the bus SB and slave interfaces (HREQ#, HACK#, GBR#, etc.). When the main processor 1 performs vector operations, etc., the vector processor unit is accessed in the following procedure.

Figure 26:
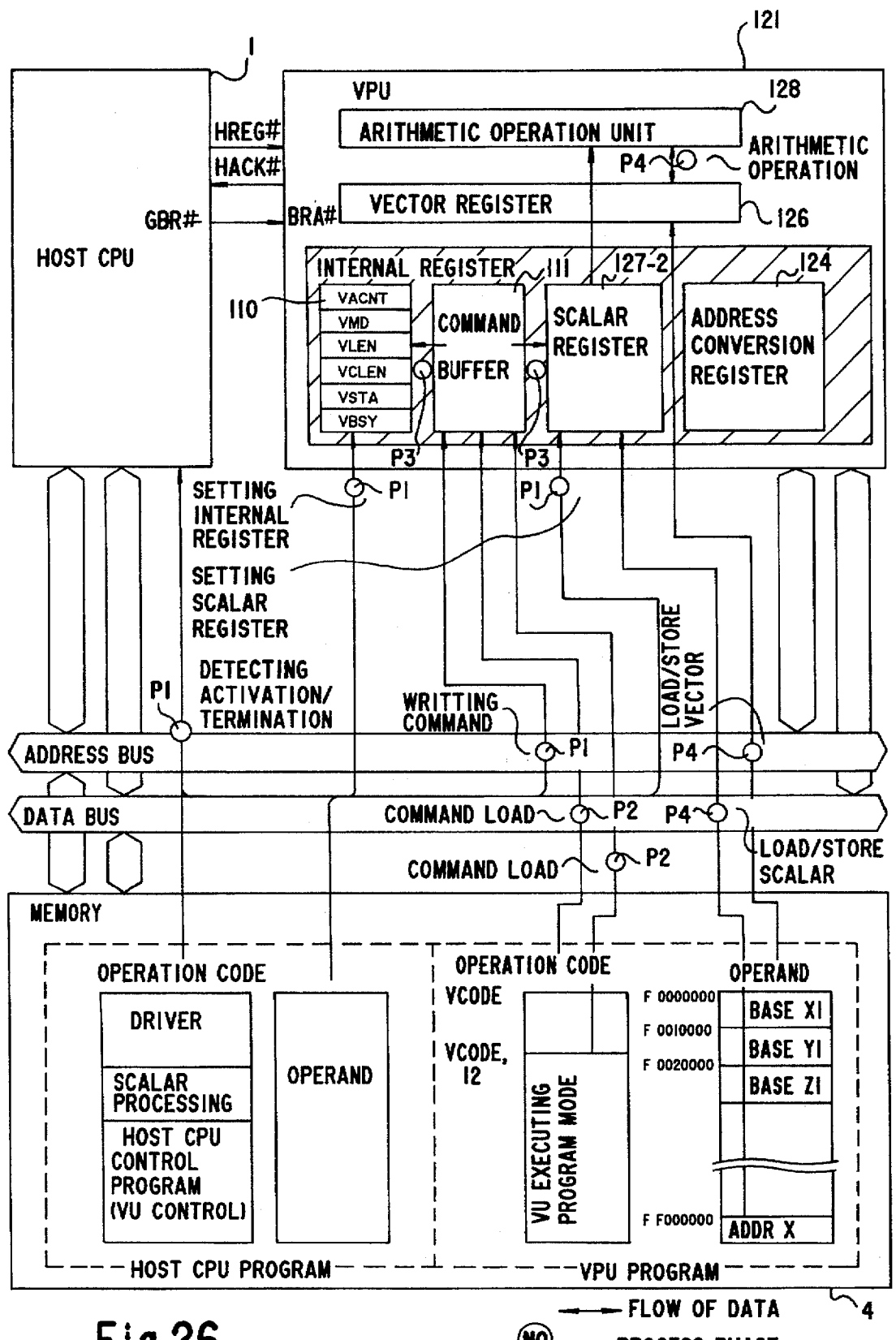
FIG. 26 is a view for explaining the controlling process between the main processor 1 and the VU of the present invention.

FIG. 26 is a view for explaining the controlling process between the main processor 1 and the VU. In phase P1, the main processor 1 executes a control program (VU control) pre-stored in the memory 4, and then initializes internal registers in the vector processor unit 121, for example, a register for the vector length, etc. A host main processor program area in the memory 4 comprises an operation code area including a soft driver, scalar process, and host main processor control programs and an operand area. Then, the main processor 1 activates the vector processor unit when the initialization is completed. This permits the vector processor unit VPU to read an operation code in the VU program area in phase P2 and read it in the command buffer. That is, a command is loaded. Then, in phase P3, command buffer P3 encodes the loaded command and outputs the instruction corresponding to each operation to an internal register 110 and the scalar register 87-2. Then, in phase P4, the vector processor unit 81 performs target operations in parallel and target processes in the pipeline mode. At this time, in the scalar process, the data of the operand in the VPU program area are loaded through the scalar register 87-2, and the result obtained by the arithmetic operation unit 128 is stored in the operand area. By contrast, in the vector process, it is loaded and stored through the vector register.

When the above described process is completed, the main processor 1 accesses a register in the vector processor unit 81, reads the completion state, and determines whether or not the process has terminated normally.

In the operation above, a memory is accessed by the memory accessing device 10 in the scalar and the vector processes in the embodiment of the present invention. At this time, if a bus-use-right release signal BRL# indicating the active state is applied from the main processor 1, etc., the bus-use-right release signals BRS#, etc. are detected with the access response signal DC# in the cycle in which the access response signal DC# is detected so that the number of memory access addresses equal that of the pieces of the data to be processed. If it is the address output and data input/output cycle, the address output is immediately suspended and control is transferred to the data input/output cycle. When the access response signal DC# for the last data D5 corresponding to the prefetched addresses is detected, the address pipeline mode is suspended and the bus-use-right request signal HREQ# is made to indicate the inactive state.

The present invention is described above in detail by referring to the vector processor unit. However, it is not limited to a vector unit, but can be applied to a unit for directly accessing a bus after obtaining a bus-use-right independently of the main processor 1.

As described above, in the present invention, when a processing unit has become inoperative to the system bus after the output of a bus-use-right request signal, a request for a bus use right is released after the assignment of the right to use the system bus is confirmed. Therefore, a bus-use-right request from any of other processors can be rejected from the moment when a processing unit becomes inoperative to the system bus to the moment when the bus-use-right request is released.

Since a bus-use-right request is released according to a bus-use-right permission signal issued by the main processor, the bus arbitration can be easily executed only by preparing a logical circuit capable of obtaining a predetermined logic from various signals.

Therefore, a malfunction caused by an error during the bus arbitration can be successfully prevented, and the specific external circuit used for the arbitration can be effectively simplified.

Furthermore, in the present invention, when a request for the interrupt or the termination of memory access controlled in the address pipeline mode is issued from an internal or external unit to the memory accessing device, the address pipeline mode is compulsorily terminated of suspended by the control unit. Therefore, the present invention provides a memory accessing device capable of improving the entire performance and reliability of the computer system.

Additionally, in the present invention, if a bus-use-right request signal from the central processing unit is received when the access response signal indicates the active state during the memory access controlled in the address pipeline mode, then the control unit terminates the input/output process of the data corresponding to the number of the prefetched addresses. Then, the memory access controlled in the address pipeline mode is suspended, and the bus-use-right request signal to the central processing unit indicates the inactive state. Therefore, the central processing unit compulsorily suspends the address pipeline mode for the memory accessing device without waiting with the bus-use-right request signal output, and then control is transferred to the next process. Thus, the performance of the entire system can be greatly improved.

In the present invention, if a bus-use-right response signal from the central processing unit indicates the inactive state due to a malfunction of a bus during the memory access controlled in the address pipeline mode, then the control unit terminates the input/output process of the data for the number of the prefetched addresses. Then, the memory access controlled in the address pipeline mode is suspended. Therefore, the reliability of the system can be greatly improved without entering a conflict for a bus with signals output by other units on a bus while the bus access is continued.

Furthermore, in the present invention, if an internal exception signal is received during the memory access controlled in the address pipeline mode, then the control unit terminates the data input/output process for the number of the prefetched addresses. Then, the memory access controlled in the address pipeline mode is suspended, and the bus-use-right request signal for the central processing unit indicates the inactive state. Therefore, an error recovery process is not delayed by continuing the bus access with an exception retained, and the reliability of the system can be greatly improved.

Also in the present invention, if an entry request signal is received during the memory access controlled in the address pipeline mode, then the control unit terminates the data input/output process for the number of the prefetched addresses. Then, the memory access controlled in the address pipeline mode is suspended. Therefore, the address pipeline mode can be compulsorily suspended.

According to the present invention, if it is detected during the memory access controlled in the address pipeline mode that the bus error signal from a bus indicates the active state when the access response signal indicates the active state, then the control unit immediately terminates the memory access controlled in the address pipeline mode. Therefore, the address pipeline mode can be compulsorily terminated.

What is claimed is:

1. A memory accessing device provided in a processing unit, said processing unit comprises a main circuit for performing a vector operation related to an address pipeline control when accessed by said memory accessing device, said memory accessing device connected to a central processing unit and memory means through a bus for reading data from/writing data to a memory in said memory means in an address pipeline mode in which addresses are output independently of said central processing unit, said address pipeline mode composed of three states of, firstly outputting addresses, secondly outputting addresses, and inputting and outputting data, and thirdly inputting and outputting data for reading/writing data to the memory, said memory accessing device comprising: address generating means for generating an address used in accessing a memory, address control means for outputting a generated address to said bus, and control means for outputting a bus-use-right request signal to said central processing unit, for receiving a) a bus-use-right response signal from said central processing unit in response to said bus-use-right request signal and b) a bus-use-right request signal from said central processing unit when said central processing unit reserves a bus-use-right, for controlling a bus-use-right, and for suspending or terminating memory reading/writing data in said address pipeline mode by controlling said address control means when there is a request internally or externally of said memory accessing device for the suspension or the termination of said memory reading/writing data in said address pipeline mode, wherein when said bus should be immediately used and said memory accessing device has said bus-use-right, said central processing unit outputs said bus-use-right request signal used for accessing the memory;

said memory means outputs an access response signal on completion of accessing one address in said memory;

on receiving said bus-use-right request signal from said central processing unit when said access response signal indicates an active state during the memory reading/writing data in said address pipeline mode, said control means completes a data input/output processing for a number of prefetched addresses, suspends the memory reading/writing data in said address pipeline mode, and makes said bus-use-right request signal from said central processing unit indicate an inactive state.

2. The memory accessing device according to claim 1, wherein said address generating means generates a subsequent address for accessing the memory in said address pipeline mode before a current data cycle for receiving data is completed; and said control means terminates said memory access after data, corresponding to an address which has been output when a termination of the memory access is requested, are received.

3. The memory accessing device according to claim 1, wherein said central processing unit outputs said bus-use-right response signal when it receives said bus-use-right request signal from said memory accessing device, if said bus-use-right response signal from said central processing unit indicates an active state due to a malfunction of a bus during the memory reading/ writing data in said address pipeline mode, then said control means completes the data input/output processing for the number of prefetched addresses, and then suspends the memory access controlled in said address pipeline mode.

4. The memory accessing device according to claim 1, wherein said address generating means comprises a conversion table for converting a logical address to a physical address, and said conversion table outputs an entry request signal when there is no corresponding physical address in said table, on receiving an entry request signal from said conversion table during the memory reading/writing data in said address pipeline mode, said control means completes the data input/output proceeding for the number of prefetched addresses, and then suspends the memory reading/writing data in said address pipeline mode.

5. The memory accessing device according to claim 1, wherein if said control means detects that a bus error signal indicates an active state showing that an error has arisen in the bus when the said access response signal indicates an active state during the memory reading/ writing data in said address pipeline mode, then said memory reading/writing data in said address pipeline mode is immediately terminated.

6. The memory accessing device according to claim 1, wherein said main circuit installed in said memory accessing device comprises exception detecting means for outputting an internal exception signal when an internal exception is detected, on receiving said internal exception signal during the memory reading/writing data in said address pipeline mode, said control means completes the data input/ output processing for the number of prefetched addresses, and then terminates the memory reading/ writing data in said address pipeline mode, and makes said bus-use-right request signal from said central processing unit indicate the inactive state.

7. The memory accessing device according to claim 6, wherein said control means further comprises:

timing sequencer means for receiving said access response signal from said memory means, a bus error signal indicating that an exception has arisen in said bus, an internal exception signal indicating that an error has arisen in the main circuit, a bus access request signal indicating a request for bus access as the result of an arithmetic operation performed by said main circuit, and a bus-use-right get signal from said control means, and for managing the sequence of the access to a bus according to said signals.

8. The memory accessing device according to claim 7, wherein said timing sequencer means receives a table entry request signal when no converted addresses from a table are stored, and controls said sequence according to said signals.

9. An information processing system including a central processing unit; a common bus; memory means; and a memory accessing device for accessing, through said common bus, a memory means in an address pipeline mode in which addresses are prefetched independently of said central processing unit, said address pipeline mode composed of three states of, firstly outputting addresses, secondly outputting addresses, and inputting and outputting data, and thirdly inputting and outputting data for reading/writing data to the memory, said memory accessing device comprising:

address generating means for generating an address used in accessing a memory, address control means for outputting a generated address to said common bus, and control means for outputting a bus-use-right request signal to said central processing unit, for receiving a) a bus-use-right response signal from said central processing unit in response to said bus-use-right request signal and b) a bus-use-right request signal from said central processing unit when said central processing unit reserves a bus-use-right, for controlling a bus-use-right and for suspending or terminating memory reading/ writing data in said address pipeline mode by controlling said address control means when there is a request internally or externally of said memory accessing device for the suspension or the termination of said memory reading/writing data in said address pipeline mode, wherein when said common bus should be immediately used and said memory accessing device has said bus-use-right, said central processing unit outputs said bus-use-right request signal used for accessing said memory;

said memory means outputs an access response signal on completion of accessing one address in said memory;

on receiving said bus-use-right request signal from said central processing unit when said access response signal indicates an active state during the memory reading/ writing data in said address pipeline mode, said control means completes a data input/output processing for a number of prefetched addresses, suspends the memory reading/writing data in said address pipeline mode, and makes said bus-use-right request signal from said central processing unit indicate an inactive state.

10. The information processing system according to claim 9, wherein said address generating means generates a subsequent address for accessing the memory in the address pipeline mode before a current data cycle for receiving data is completed; and said control means suspends or terminates said memory access after data, corresponding to an address which has been output when a suspension or termination of the memory access is requested, are received.

11. The information processing system according to claim 9, wherein said central processing unit outputs said bus-use-right response signal when it receives said bus-use-right request signal from said memory accessing device, if said bus-use-right response signal from said central processing unit indicates an active state due to a malfunction of a bus during the memory reading/ writing data in said address pipeline mode, then said control means completes the data input/output processing for the number of prefetched addresses, and then suspends the memory reading/writing data in said address pipeline mode.

12. The information processing system according to claim 9, wherein said address generating means comprises a conversion table for converting a logical address to a physical address, and said conversion table outputs an entry request signal when there is no corresponding physical address in said table, on receiving an entry request signal from said conversion table during the memory reading/writing data in said address pipeline mode, said control means completes the data input/output processing for the number of prefetched addresses, and then suspends the memory reading/writing data in said address pipeline mode.

13. The information processing system according to claim 9, wherein if said control means detects that a bus error signal indicates an active state showing that an error has arisen in said bus when said access response signal indicates an active state during the memory reading/writing data in said address pipeline mode, then said memory reading/writing data in said address pipeline mode is immediately terminated.

14. The memory accessing device according to claim 9, wherein said memory accessing device is provided in a processing unit and said processing unit comprises a main circuit for performing a vector operation related to said address pipeline control when accessed by said memory accessing device.

* * * * *